(12) United States Patent
Lillo

(10) Patent No.: US 10,639,972 B1
(45) Date of Patent: May 5, 2020

(54) SCHOOL BUS EMERGENCY EGRESS SYSTEM

(71) Applicant: Michael A. Lillo, Willard, OH (US)

(72) Inventor: Michael A. Lillo, Willard, OH (US)

( * ) Notice: Subject to any disclaimer, the term of this patent is extended or adjusted under 35 U.S.C. 154(b) by 50 days.

(21) Appl. No.: 15/981,126

(22) Filed: May 16, 2018

Related U.S. Application Data

(60) Provisional application No. 62/635,847, filed on Feb. 27, 2018.

(51) Int. Cl.
| | |
|---|---|
| *B60J 5/10* | (2006.01) |
| *B60R 3/02* | (2006.01) |
| *B60G 11/27* | (2006.01) |
| *B60G 17/052* | (2006.01) |
| *B62D 47/02* | (2006.01) |

(52) U.S. Cl.
CPC ............... *B60J 5/108* (2013.01); *B60G 11/27* (2013.01); *B60G 17/0523* (2013.01); *B60R 3/02* (2013.01); *B60G 2202/152* (2013.01); *B60G 2300/14* (2013.01); *B60G 2500/30* (2013.01); *B62D 47/02* (2013.01)

(58) Field of Classification Search
CPC ........ B60J 5/108; B60R 3/02; B60G 17/0523; B60G 11/27; B60G 2300/14; B60G 2500/30; B60G 2202/152; B62D 47/02
See application file for complete search history.

(56) References Cited

U.S. PATENT DOCUMENTS

| | | | | |
|---|---|---|---|---|
| 5,467,855 A | * | 11/1995 | Sorensen ................ | B60P 1/431 193/5 |
| 5,803,523 A | * | 9/1998 | Clark ..................... | B60P 1/435 14/71.1 |
| 5,813,071 A | * | 9/1998 | Breslin .................. | B60P 1/431 14/71.1 |
| 6,345,950 B1 | * | 2/2002 | Gerwitz ............... | B65G 11/143 414/537 |
| 6,409,458 B1 | * | 6/2002 | Cohn ..................... | A61G 3/061 14/71.1 |
| 2006/0245883 A1 | * | 11/2006 | Fontaine ................ | A61G 3/061 414/537 |
| 2010/0242189 A1 | * | 9/2010 | Goin ...................... | B60P 1/431 14/71.1 |
| 2011/0027054 A1 | * | 2/2011 | Hansen .................. | A61G 3/061 414/523 |
| 2012/0279417 A1 | * | 11/2012 | Charbonneau ......... | B60J 5/0497 105/348 |
| 2014/0219756 A1 | * | 8/2014 | Smith .................... | A61G 3/061 414/537 |
| 2014/0265403 A1 | * | 9/2014 | Farber ................... | A61G 3/0236 296/19 |

* cited by examiner

*Primary Examiner* — Darlene P Condra
(74) *Attorney, Agent, or Firm* — Ralph E. Jocke; Walker & Jocke

(57) ABSTRACT

An emergency egress system for a multi-passenger vehicle such as a school bus (10) includes a housing (30) that operatively supports a ramp (34) in movable connection therewith. Opening an emergency exit door (18) of the bus causes a housing door (24) to open and the ramp to move outwardly from a retracted position toward an extended position. Opening the emergency exit door also causes the suspension of the bus to be automatically lowered to place the emergency exit opening (16) closer to the ground (166).

28 Claims, 20 Drawing Sheets

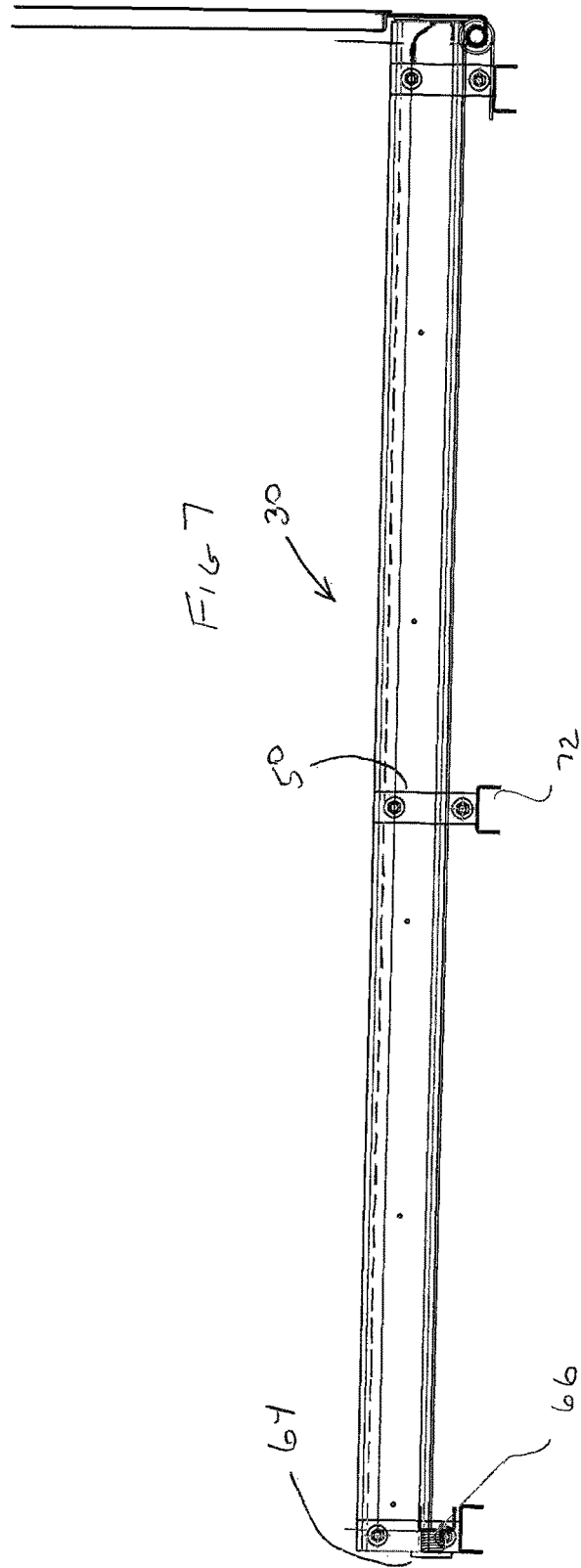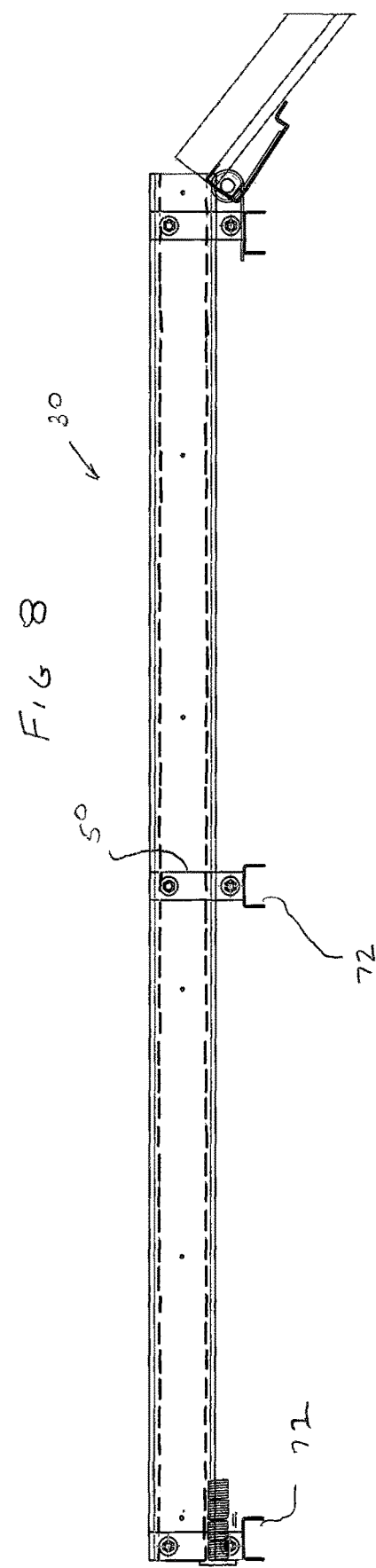

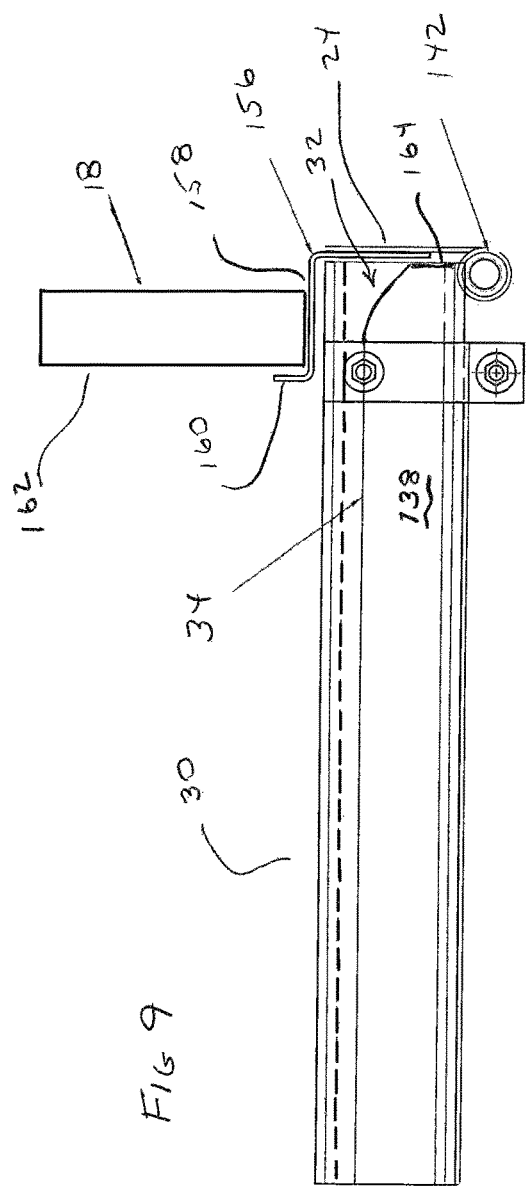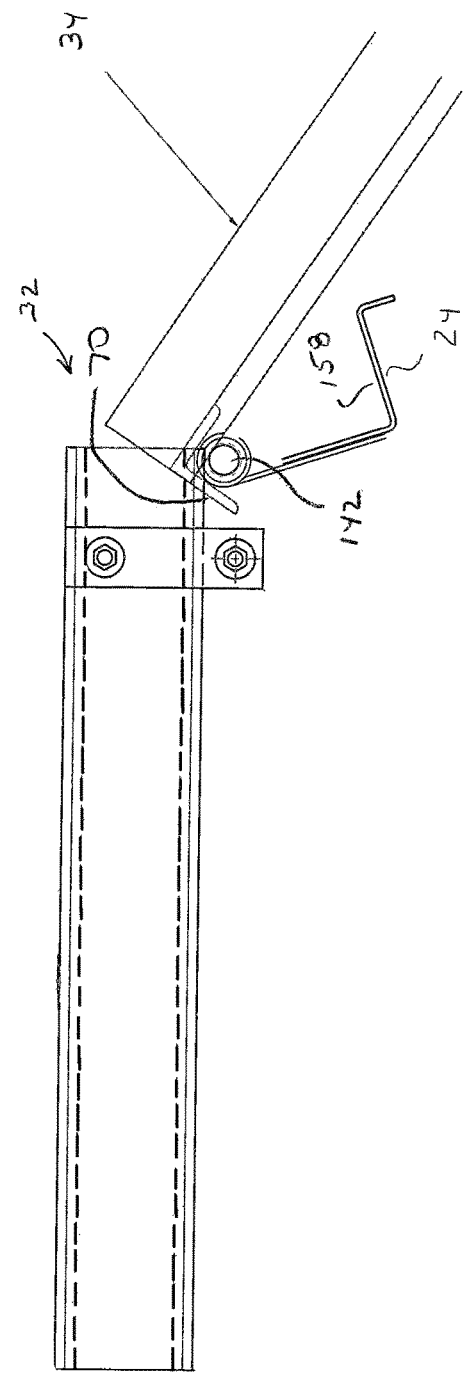

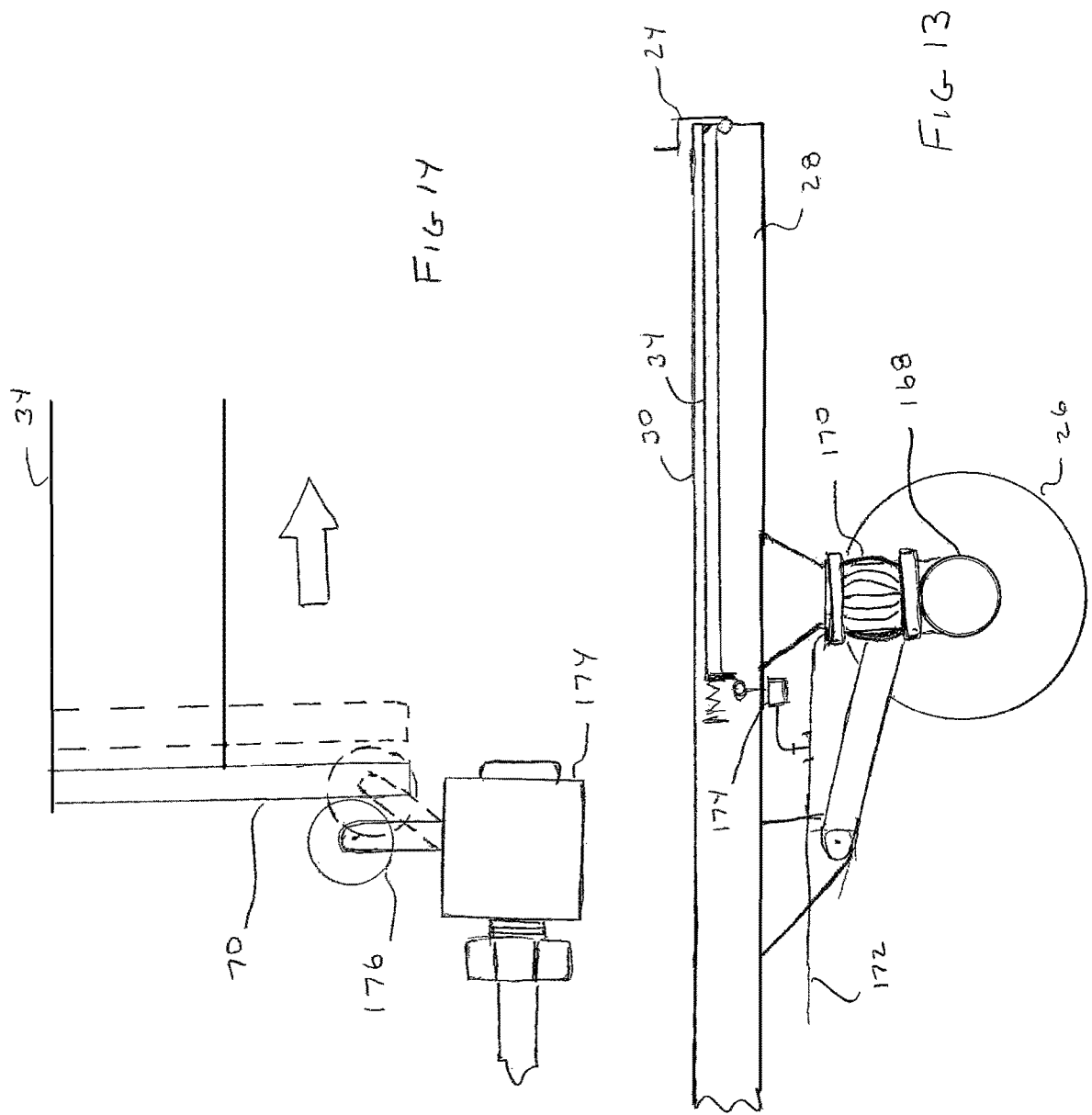

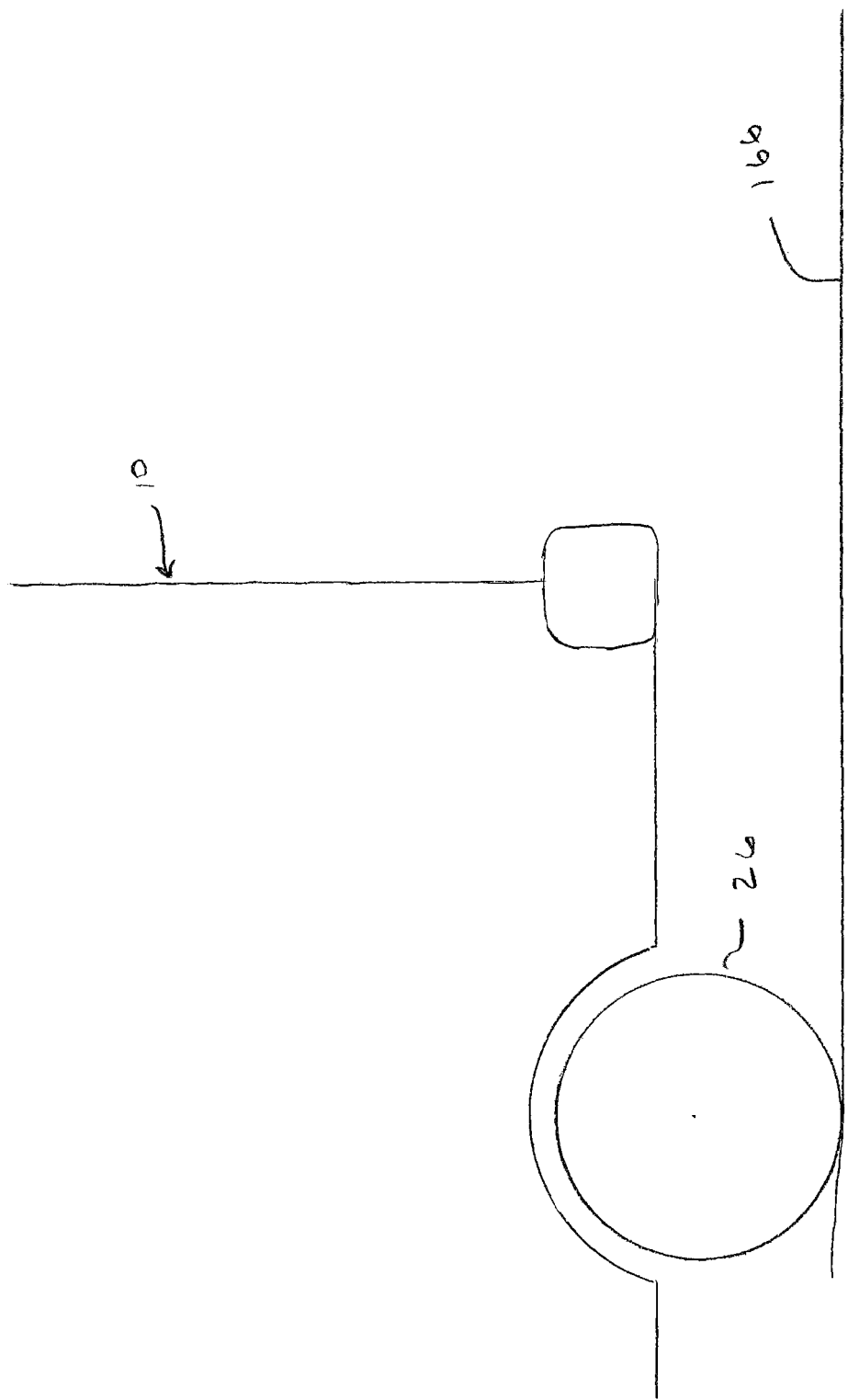

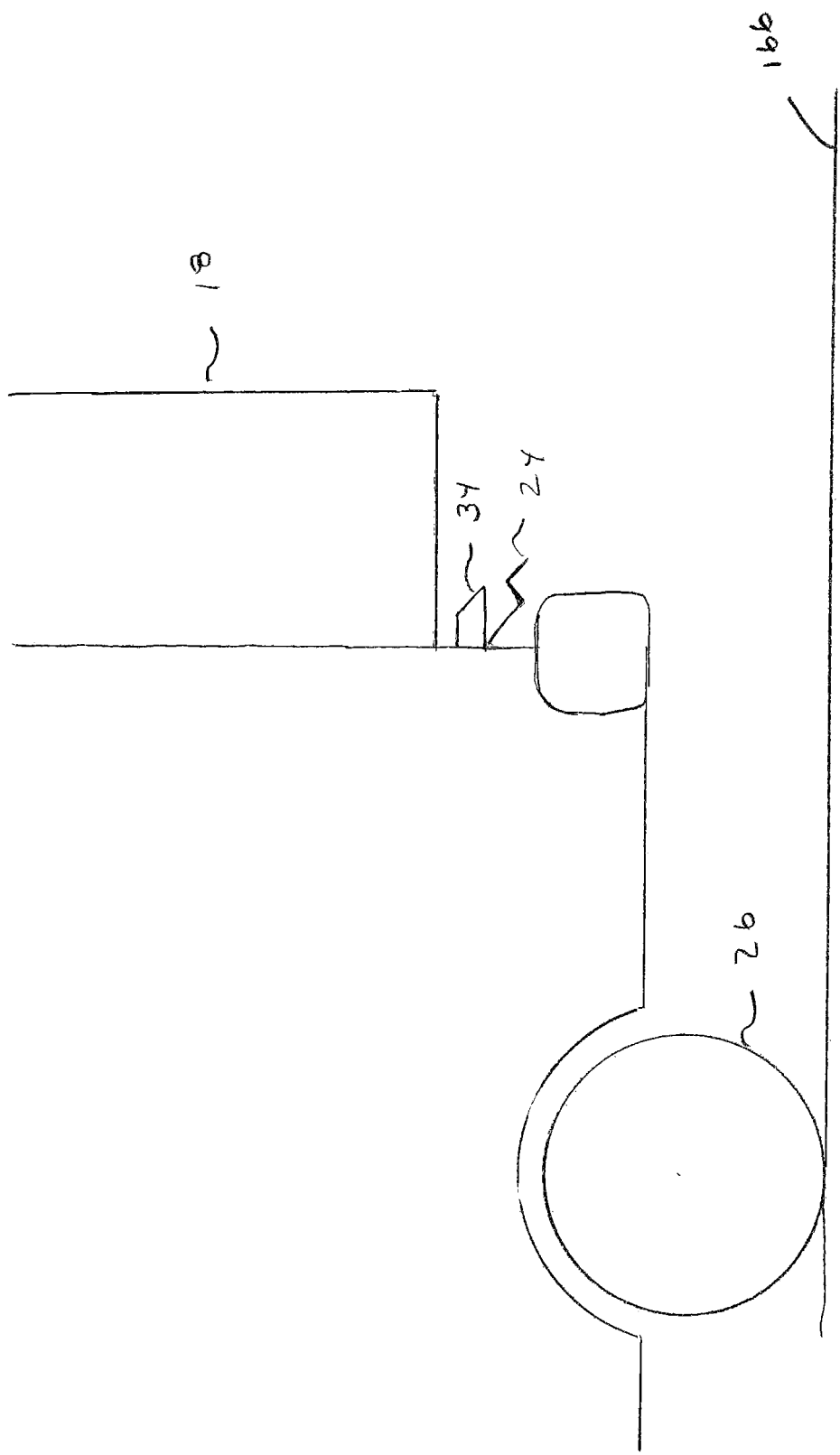

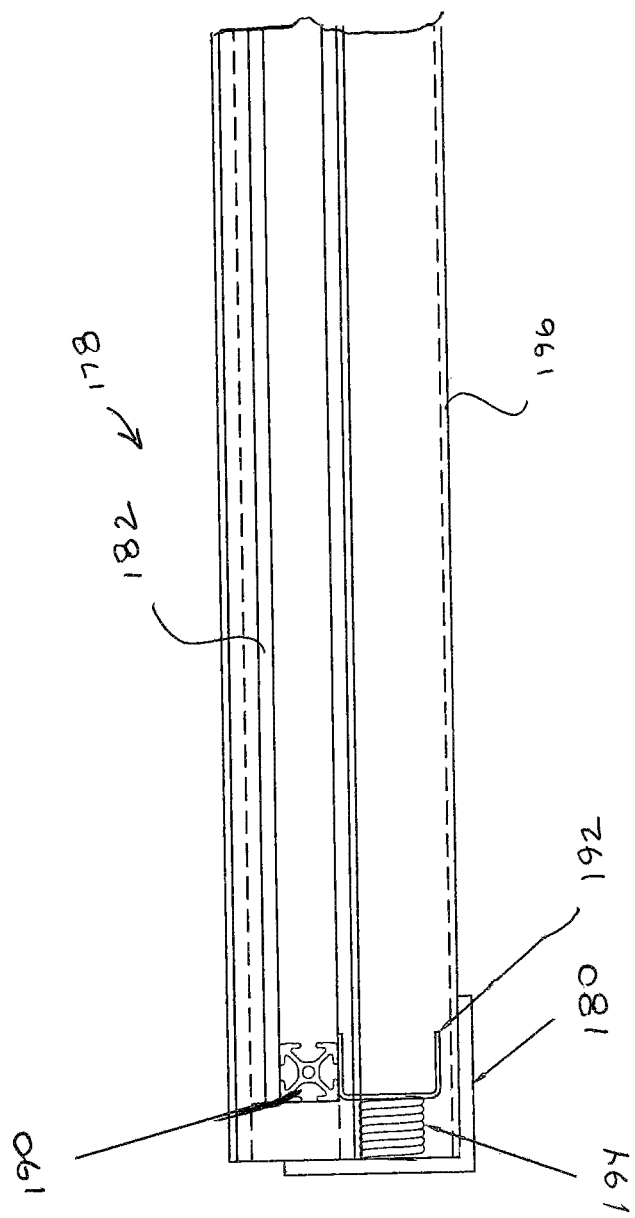

SCHOOL BUS EMERGENCY EGRESS SYSTEM

TECHNICAL FIELD

Exemplary embodiments relate to a system for providing emergency egress from a multi-passenger vehicle. Exemplary embodiments are particularly directed to an emergency egress system that can be used with a bus, such as a school bus.

BACKGROUND

Multi-passenger vehicles typically include one or more exits that are to be used by persons to leave the interior area of the vehicle only in emergencies. Such emergency exits remain closed by emergency exit doors at all other times during vehicle operations.

In the case of some multi-passenger vehicles such as school buses, when an emergency exit door is opened, the emergency exit opening may be a significant distance above the ground. To jump from such a distance to the ground may present a challenge for some small children or for disabled individuals.

Emergency egress systems from school buses and other multi-passenger vehicles may benefit from improvements.

SUMMARY OF DISCLOSURE

Exemplary embodiments relate to an apparatus that provides improved emergency egress for persons from an interior area of the school bus or other multi-passenger vehicle. Exemplary arrangements provide for an extendable ramp which becomes automatically accessible adjacent to an emergency exit opening when the emergency exit door is movable from a closed position to an open position. The exemplary ramp is extendable from a retracted position to an extended position in which the ramp extends from adjacent to the bottom of the emergency exit opening to the ground. Persons in the vehicle may leave the interior area through the emergency exit opening and travel down the ramp from the vehicle to the ground.

Further exemplary embodiments provide for the suspension of the school bus or other vehicle to be lowered automatically responsive to opening of the exit door. As a result the ramp in the extended position is at a lesser acute angle than it would be with the vehicle in the normal condition. The smaller angle of the ramp may make it easier for persons leaving the vehicle to travel down the ramp to the ground.

Exemplary embodiments provide numerous other beneficial features and capabilities as hereinafter discussed.

BRIEF DESCRIPTION OF DRAWINGS

FIG. 7 is a side view of the housing and ramp of the emergency egress system, with the ramp in a retracted position, the emergency exit door in a closed position, and the housing door in a housing closed position.

FIG. 8 is a side view similar to FIG. 7, but with the housing door in a housing open position and with the ramp in the extended position.

FIG. 9 is an enlarged view of the rear portion of the housing, housing door, ramp and emergency exit door in the positions shown in FIG. 7.

FIG. 10 is an enlarged view of the housing, housing door and ramp in the extended position as shown in FIG. 8, and with the stop attached to the ramp in engagement with the member that prevents the ramp from moving outward beyond the extended position.

FIG. 13 is a schematic view of the exemplary ramp in a retracted position and the suspension components of the exemplary bus.

FIG. 14 is a schematic view of an air valve including a movable air release arm that moves responsive to ramp movement from the retracted position toward the extended position.

FIG. 15 is a side view of the exemplary bus shown in a condition prior to opening the emergency exit door.

FIG. 16 is a view similar to FIG. 15 showing the emergency exit door open, the housing door having moved from the housing closed position to the housing open position, and the ramp having moved from the retracted position toward the extended position.

FIG. 24 is a horizontal cross-sectional side view of the front portion of the alternative ramp and housing.

DETAILED DESCRIPTION

Figure 1:
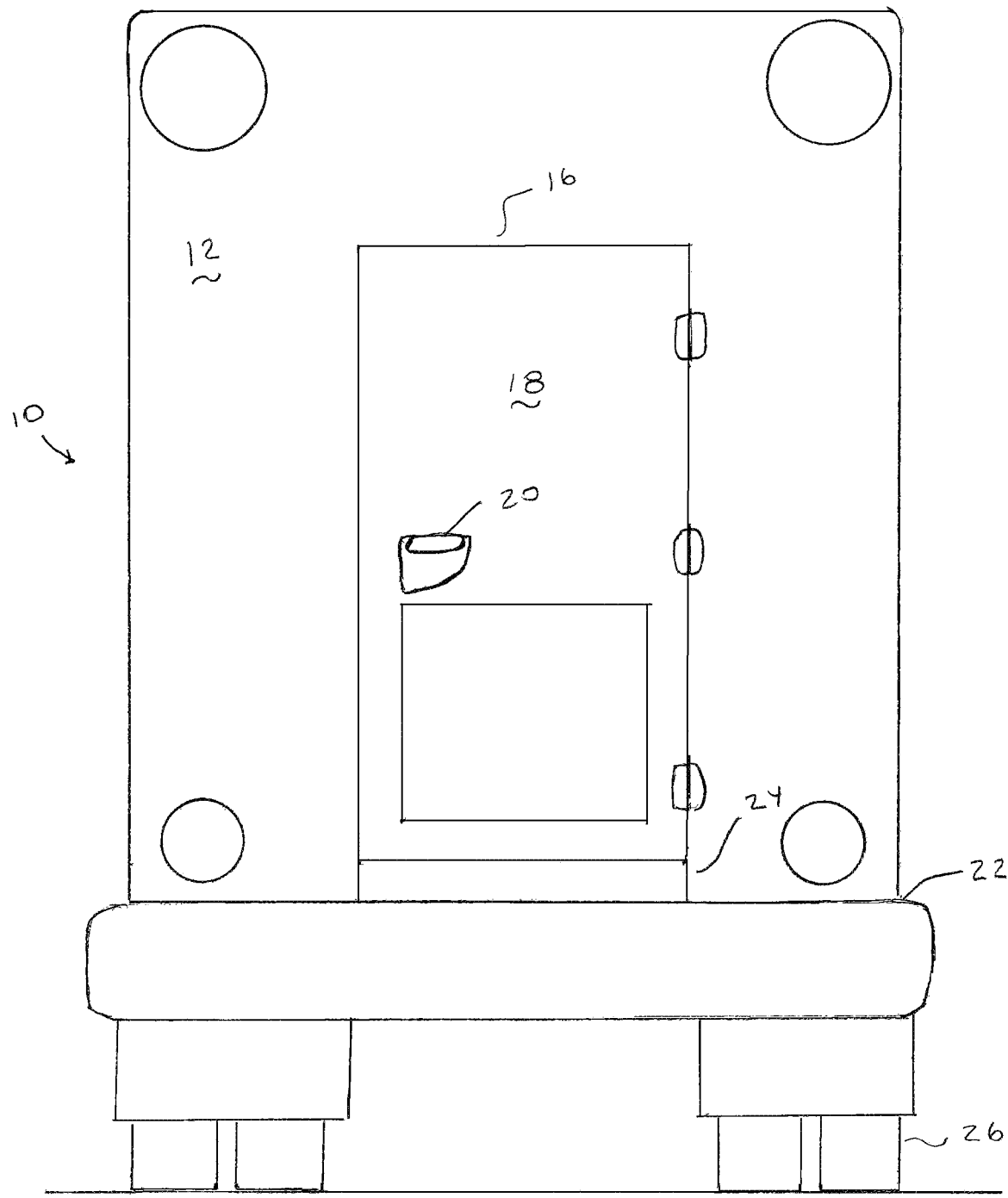
FIG. 1 is a rear view of an exemplary multi-passenger vehicle such as a school bus.

Referring now to the drawings and particularly to FIG. 1 there shown therein an exemplary multi-passenger vehicle 10 which incorporates the emergency egress system of an exemplary embodiment. The exemplary vehicle 10 shown is a school bus, however it should be understood that systems of the type described herein may be used in conjunction with other types of multi-passenger vehicles.

Figure 17:
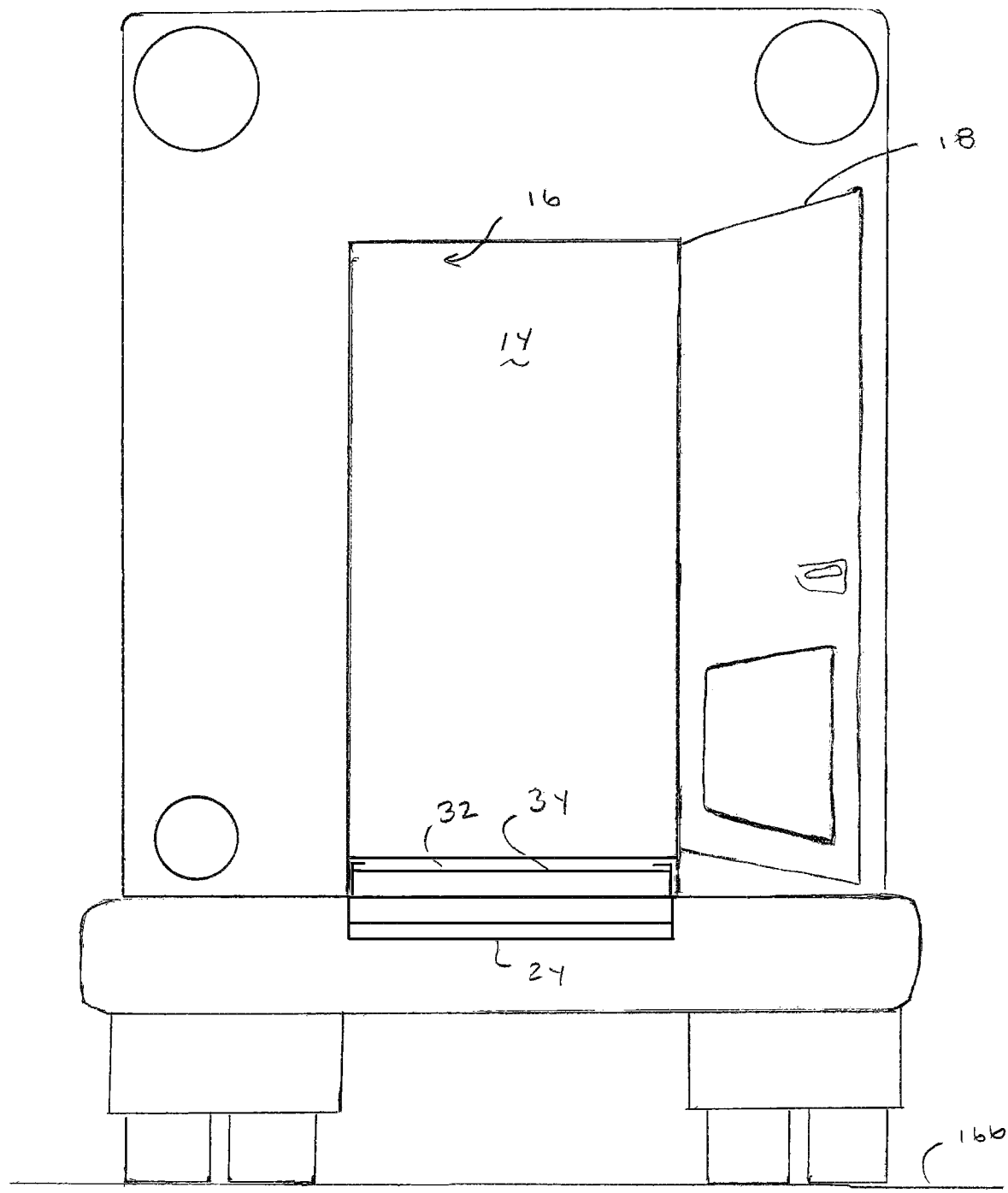
FIG. 17 is a rear view of the exemplary bus in the condition shown in FIG. 16.

In the exemplary embodiment the bus 10 includes a body 12 which bounds an interior area 14 (see FIG. 17) in which persons are housed during transport. The body includes an emergency exit opening 16. The emergency exit opening is normally closed during operation by an emergency exit door 18. The exemplary emergency exit door 18 includes interior and exterior handles 20 that can be manually engaged and moved such that the emergency exit door can be changed from a latched closed condition in which the door is latched and held in a closed position as shown in FIG. 1, and an openable condition in which the door is movable between the closed position to an open position as shown in FIG. 17. Of course it should be understood that the emergency exit door configuration is exemplary and in other embodiments other configurations may be used.

The exemplary bus includes a rear bumper 22. A housing door 24 later described in detail, extends above the rear bumper, and in the closed position shown in FIG. 1 the housing door 24 is in operative engagement with the emergency exit door 18. The bus 10 is movably supported by tires 26. The exemplary body 12 of the bus 10 is supported through a suspension system that is later discussed.

Figure 2:
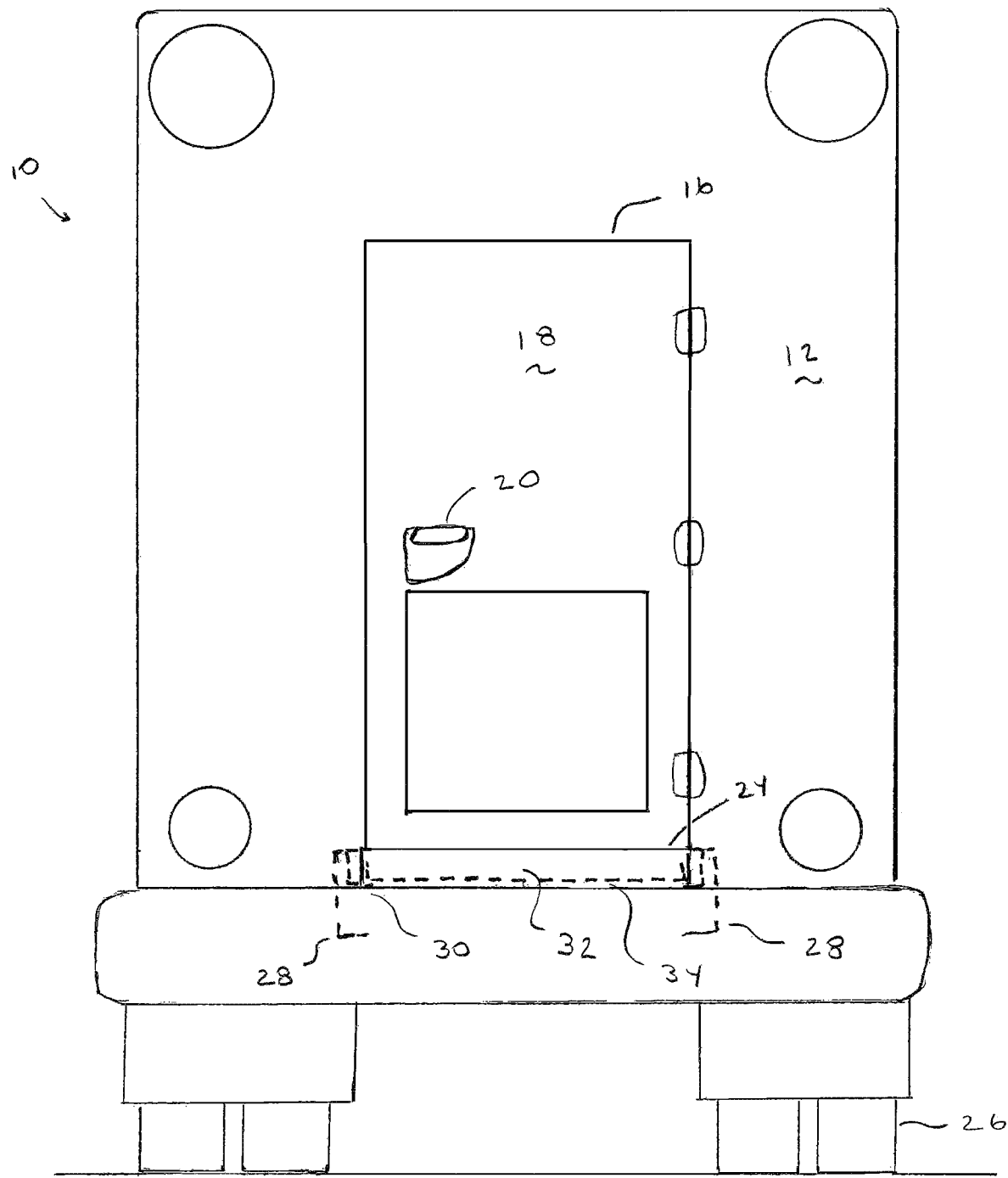
FIG. 2 is a view similar to FIG. 1, but with the vehicle frame rails and components of the exemplary emergency egress system shown in phantom.

As represented in FIG. 2 the exemplary bus body 12 is supported by a vehicle frame which includes a pair of longitudinally extending, horizontally disposed frame rails 28. A housing 30 of the exemplary emergency egress system is mounted in operatively fixed connection horizontally between the frame rails 28. The exemplary housing 30 bounds an opening 32 which houses a movable ramp 34 as later discussed in detail. In the exemplary arrangement the housing opening is in horizontal transverse alignment and is positioned vertically below the emergency exit opening 16. By being in transverse alignment with the emergency exit opening, the ramp 34 when in the extended position is vertically aligned with at least a substantial portion of the emergency exit opening so that persons leaving the interior area 14 through the emergency exit opening 16 can step outward onto the ramp 34 when the ramp is in the extended position.

The exemplary housing 30 includes a pair of horizontally disposed elongated side rails 36, 38. Each of the side rails is generally C-shaped in horizontal cross-section. The side rails 36, 38 of the housing 30 are mounted horizontally between and in operatively supported connection with the frame rails 28 of the bus. Each exemplary side rail includes a horizontally inward extending lower lip 40 and a horizontally inward extending upper lip 42. A vertically extending web portion 44 extends in vertical cross section between the respective upper and lower lips of each of the exemplary side rails.

In the exemplary arrangement a pair of elongated support bars 46, 48 are in fixed operative connection with side rails 38 and 36 respectively. Each respective support bar is in fixed attached connection with a respective side rail through welding or other suitable attachment methods. A plurality of spacers 50 extend horizontally between an inner surface of each frame rail 28 and a horizontally outboard surface of respective support bar. In the exemplary arrangement fasteners 52 extend through holes in the spacers 50 and engage threaded openings in the adjacent support bar. This arrangement holds the housing 30 in fixed operatively supported connection between the frame rails 28 of the bus. Of course it should be understood that this mounting is exemplary and in other embodiments other mounting arrangements may be used.

In the exemplary arrangement in vertical cross section the upper lips 42, lower lips 40 and web portions 44 of the respective side rails define a channel cavity generally indicated 54. The channel cavity is generally rectangular in vertical cross-section and bounds an area in which the exemplary ramp 34 is constrained to move. The channel cavity of the exemplary embodiment is configured to require the ramp 34 to move generally horizontally and parallel to the frame rails 28 of the bus. This exemplary arrangement assures that the ramp 34 moves in the proper orientation from a retracted position in which the entire length of the ramp or at least a majority of the entire length of the ramp is positioned horizontally between the side rails, to an extended position in which the ramp extends outwardly from the housing and extends from the housing to the ground.

In the exemplary arrangement each of the upper lips 42, lower lips 40 and web portions 44 of each respective side rail include respective inner faces 56, 58 and 60. In the exemplary arrangement a low friction material overlies each of the inner faces 56, 58 and 60 to facilitate movement of the ramp 34 within the channel cavity 54. In the exemplary arrangement a high density low friction plastic insert 62 that is generally U-shaped in vertical cross-section is positioned in engagement with the inner faces of the respective side rail. In the exemplary arrangement the ramp 34 is in movably supported in operative connection with the lower lips 40 of the side rails 36, 38 through the low friction plastic insert 62. This facilitates movement of the ramp and reduces the force required to achieve movement of the ramp from the retracted position to the extended position. Of course it should be understood that this arrangement for reducing the force required to achieve ramp movement is exemplary and in other embodiments other approaches may be used. For example, in other arrangements rather than having a pair of disposed continuous channels, the channels may be comprised of discrete channel segments that are longitudinally disposed from one another along the length of housing area in which a ramp is housed. Alternatively in other arrangements, other channel configurations such as an L-shaped channel side rails or segments or I-shaped channel side rails or segments may be utilized.

Figure 6:
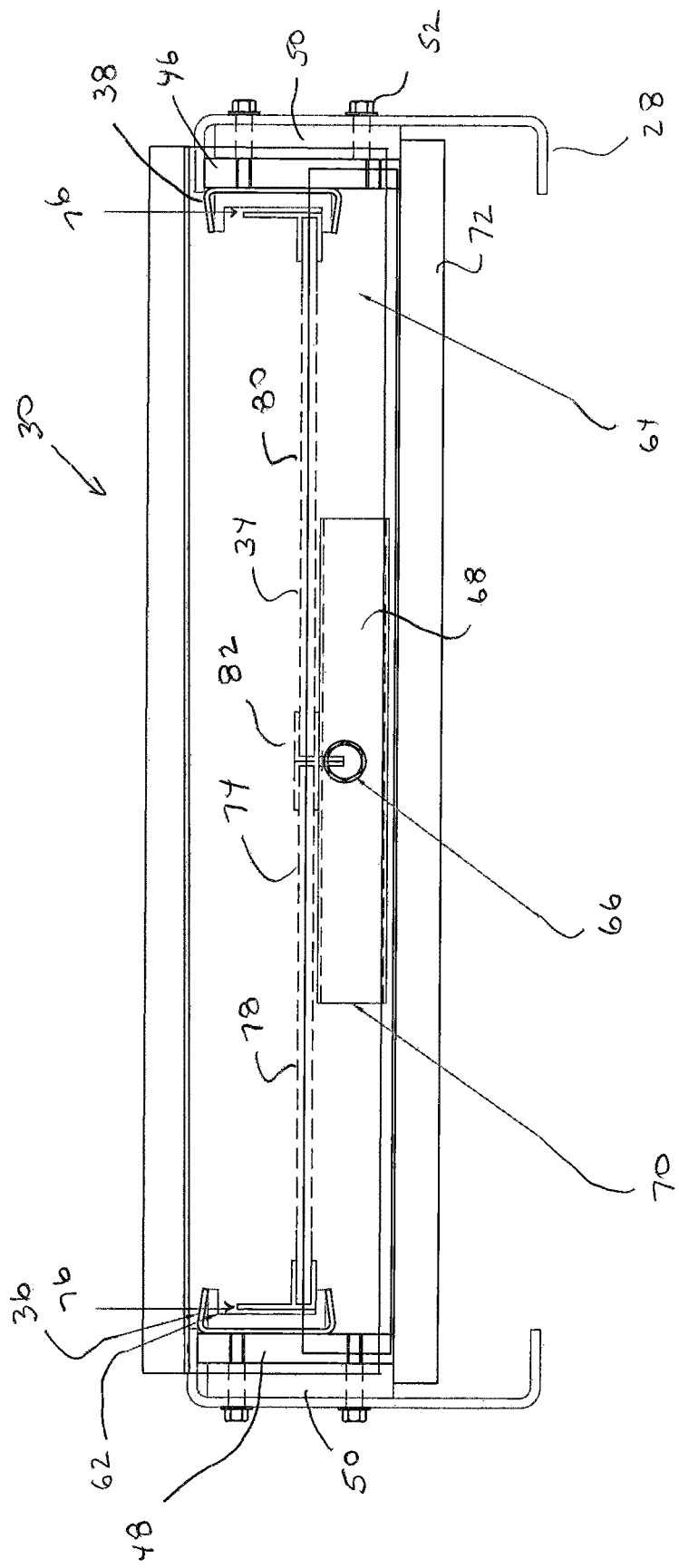
FIG. 6 is a front view of the emergency egress system shown with the housing door in the housing closed position.

As shown in FIG. 6 the exemplary housing 30 is bounded at the front end by a front member 64. The front member 64 extends horizontally between the side rails 36 and 38 and the support bars 46 and 48. In the exemplary arrangement the front member extends vertically downward below the bottom face of the ramp 34. The exemplary front member further engagingly supports at least one ramp deployment spring 66, which in the exemplary embodiment comprises at least one compression spring the function of which is later discussed. The at least one ramp deployment spring 66 is positioned to operatively engage a back surface 68 of a ramp stop 70 which is in fixed operative connection with the ramp 34.

Further in the exemplary arrangement, a plurality of horizontally extending struts 72 are in operative connection with the housing 30. In the exemplary arrangement each strut 72 is in fixed operative connection with a horizontally disposed pair of spacers 50. The struts 72 serve to maintain the dimensional integrity of the housing 30, provide enhanced rigidity for the housing assembly and facilitate the positioning and mounting of the housing assembly between the frame rails 28 of the bus. Of course it should be understood that this reinforcement approach utilizing the struts 72 is exemplary and that other arrangements may be used in other embodiments.

In one exemplary arrangement the ramp 34 is comprised of a generally flat longitudinally and horizontally extending base portion 74 and vertically extending side end portions 76. The vertically extending end portions are disposed at each horizontal side of the base portion of the ramp 34. The vertically extending end portions 76 are disposed horizontally inward of the web portions 44 of the side rails and inwardly of the vertically extending faces of the low friction plastic inserts 62. In the exemplary arrangement the vertically extending portions are positioned vertically above the horizontally inwardly extending lower lips 40 of the side rails and in movable connection above the inward extending face of each plastic insert that vertically overlies each inward extending lower lip.

Figure 12:
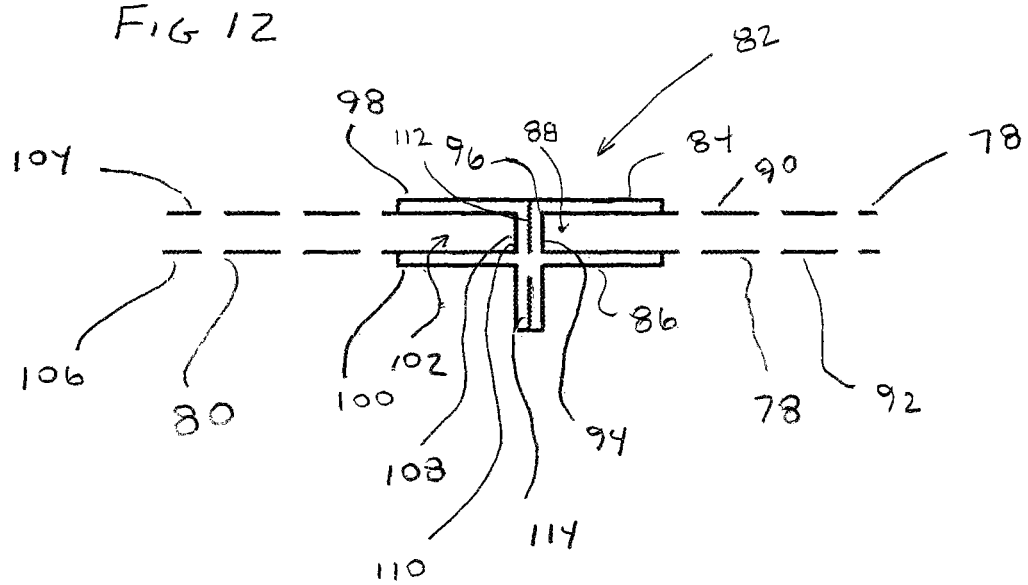
FIG. 12 is a vertical cross-sectional view of a base portion of the ramp.

In this exemplary arrangement the ramp 34 is comprised of a pair of adjacent horizontally extending elongated generally flat plates 78, 80. The flat plates 78, 80 are connected through a longitudinally elongated connector piece 82. The flat plates 78, 80 in fixed connection with the connector piece form the base portion 74 of the ramp. As shown in horizontal cross section in FIG. 12, the exemplary connector piece 82 includes a top flange 84 and a bottom flange 86. A recess 88 extends between the top and bottom flanges 84, 86. A top face 90 of flat plate 78 is in abutting engagement with the top flange 84 within the recess 88. A bottom face 92 of flat plate 78 is in abutting engagement with the bottom flange 86 within the recess 88. An inside face 94 of the flat plate 78 that extends between the top face 90 and the bottom face 92, is positioned in abutting engagement with an inside surface 96 that bounds recess 88.

The exemplary connector piece 82 further includes a top flange 98 and a bottom flange 100, which bound a recess 102. A top face 104 of flat plate 80 extends in the recess 102 and in abutting engagement with top flange 98. A bottom face 106 extends in the recess 102 and in abutting engagement with the bottom flange 100. An inside face 108 extends between the top face 104 and 106, and engages an inside surface 110 which bounds the recess.

In the exemplary arrangement the flat plates 78, 80 and the connector piece 82 are held in fixed engagement by welding or other fastening methods. This enables the ramp to be comprised of smaller horizontal plate sections to facilitate the construction thereof. It also provides the benefit that ramps of varied horizontal widths may be more readily constructed to suit the particular configuration of the vehicle on which the system is to be installed. The structure may also be comprised of different materials to provide desirable properties such as low weight, higher surface traction or corrosion resistance for example. Of course it should be understood that in other exemplary arrangements ramps comprising a single flat plate or more than two connected flat plates or other structures may be utilized. In some exemplary arrangements the top faces of the plates may be contoured or coated with a high friction material to avoid slipping by persons who travel on the ramp.

Further in the exemplary arrangement the connector piece 82 includes a pair of longitudinally extending projections 112, 114 at the forward end thereof. Projections 112 and 114 of the exemplary arrangement are utilized for purposes of positioning the at least one spring 66 which operates to move the ramp from the retracted position toward the extended position. In the exemplary arrangement projection 114 extends within an inside diameter of a helical coil spring 66. Projection 114 serves to engage and position the spring so that it is properly extending horizontally and along the direction of the base portion 74 of the ramp when the spring is compressed. The projection 112 extends outside the helical coil spring and in the exemplary arrangement further helps to hold the spring in the proper horizontal position while the spring is compressed. Of course this arrangement for helping to hold the one or more ramp deployment springs in proper position is exemplary, and in other embodiments other approaches may be used.

Figure 11:
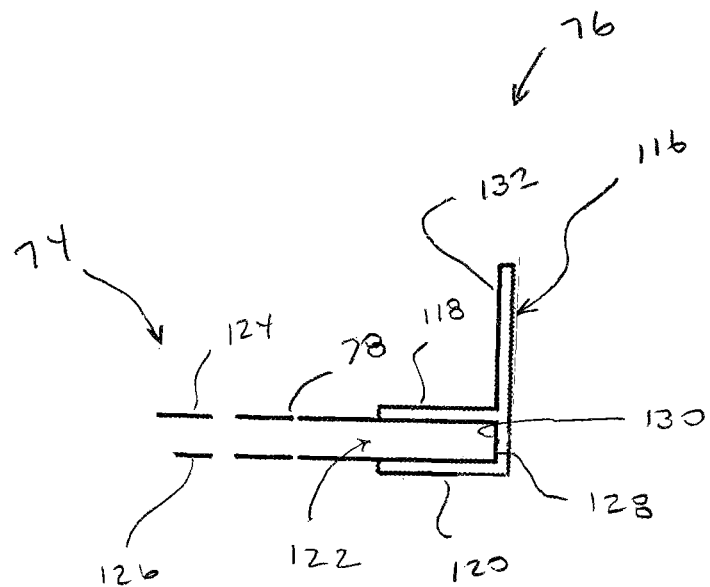
FIG. 11 is a vertical cross-sectional view of an end piece of the ramp.

In this exemplary arrangement the vertically extending end portions 76 of the ramp 34 each include end pieces 116 one of which is shown in vertical cross section in FIG. 11. It should be understood that while FIG. 11 shows an end piece that is positioned on the right side of the base portion 74 of the ramp when viewed from the rear of the vehicle, the end portion on the left side of the ramp will be the mirror image thereof.

The exemplary end piece 116 includes an upper flange 118 and a bottom flange 120 which bound a recess 122. The flat plate 74 extends in the recess 122. A horizontally extending top face 124 of the plate extends in abutting engagement with the upper flange 118. A horizontally extending bottom face 126 extends in abutting engagement with the bottom flange 120. A vertically extending lateral face 128 extends between the top face and the bottom face. The lateral face 128 extends in abutting engagement with an inside face 130 that internally bounds the recess.

The exemplary end piece 116 further includes a side flange 132 that extends vertically upward and perpendicular to the top face 124. The exemplary end piece 116 is held in fixed attached connection with the flat plate 78 through welding or other fastening methods. In the exemplary arrangement, the side flange 132 when the ramp is in the operative position, is disposed horizontally inward a small distance from the vertically extending inner face of the low friction plastic insert 62 to enable horizontal movement of the ramp. The bottom flange 120 is formed to be generally smooth so that it is generally freely movable in operatively supported slidable relation with the adjacent inward extending lower lip 40 of the adjacent side rail and the corresponding horizontally inward extending surface of the plastic insert 62 that overlies the lower lip 40. Of course it should be understood that in other exemplary arrangements the bottom flange 120 may be coated with a low friction plastic or other material to facilitate movement of the ramp within the housing. In still other exemplary embodiments other structures and arrangements may be utilized including rollers, bearings or other structures suitable for reducing resistance to movement of the ramp relative to the adjacent housing structures.

In other exemplary arrangements the ramp may be comprised of a single unitary structure. For example in some arrangements the ramp may be comprised of a generally planar piece of material with lateral side walls that extend vertically but are not as vertically elongated as in the previous embodiment, which side walls serve the functions of the end pieces previously described. In some exemplary arrangements such ramps may be comprised of metals such as aluminum or steel, or suitable metal alloys. In other exemplary arrangements the ramp may be comprised of a molded plastic material or reinforced plastic material or assemblies of components comprised of such materials. In further alternative arrangements ramps may be comprised of one or more components comprised of high-strength carbon fiber. In some embodiments ramps comprised of molded material may include integral surface features such as ribs, recesses, contours or surface roughness to provide enhanced frictional engagement to prevent slippage by persons who travel down the ramp. In other exemplary arrangements surface treatments may be applied to the ramps to achieve enhanced friction properties. Of course it should be understood that these approaches are exemplary in other embodiments other approaches to be used.

Figure 3:
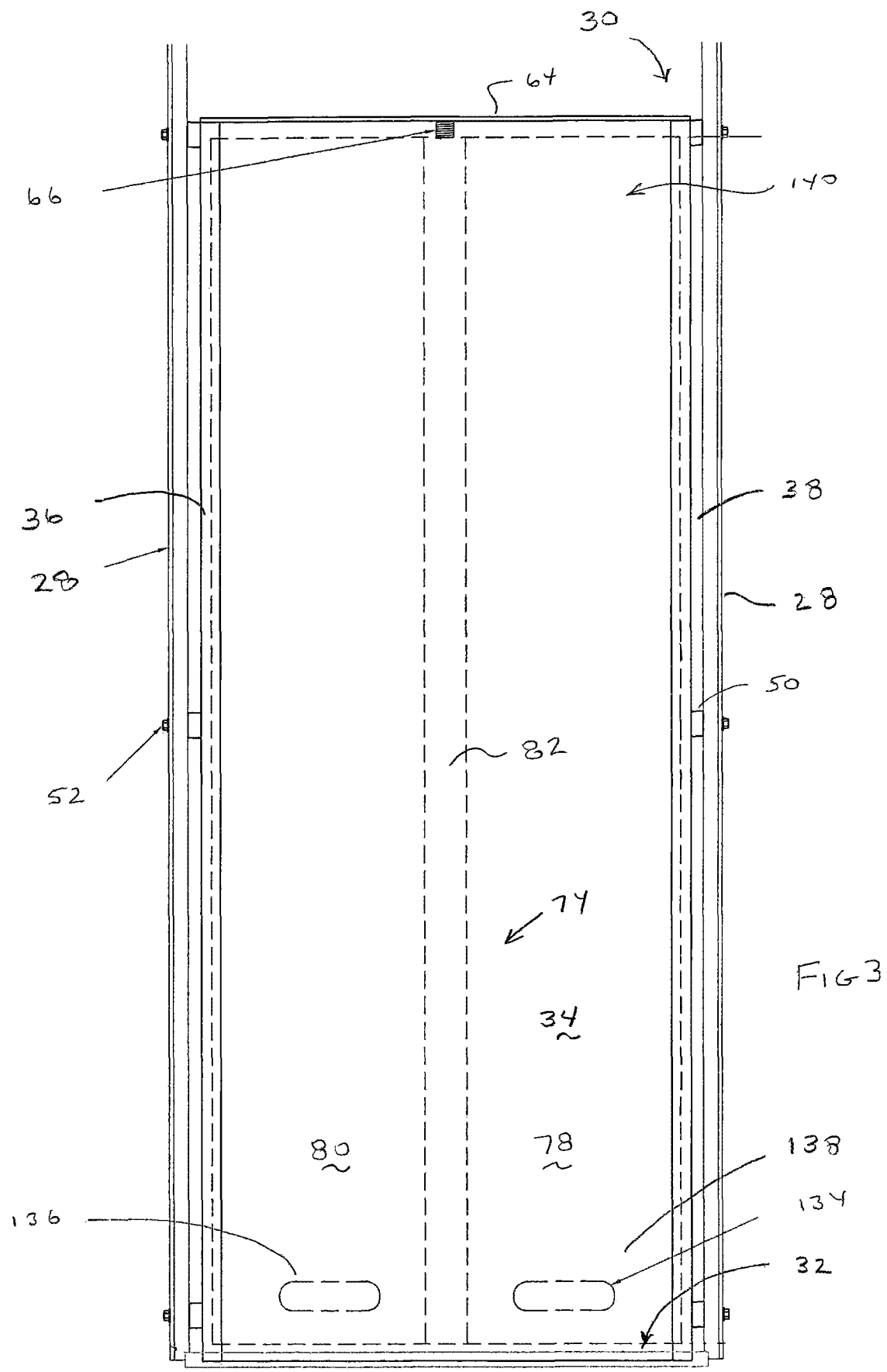
FIG. 3 is a top view of the housing of the exemplary emergency egress system positioned between the frame rails of the bus, and with the ramp of the exemplary system shown in phantom.

As shown in FIG. 3, the exemplary ramp 34 includes manually engageable handles 134, 136. In the exemplary arrangement the manually engageable handles are comprised of openings through the flat plates 78, 80 which comprise the base portion 74 of the exemplary ramp 34. In the exemplary arrangement that handles extend through the base portion of the ramp 34 in a ramp outer end 138. The ramp outer end 138 includes the portion of the ramp closest to the ramp housing opening 32 when the ramp is in the retracted position as shown in FIG. 3, for example. The ramp outer end is disposed from a ramp inner end 140. The exemplary ramp inner end is opposed of the ramp outer end, and is operatively connected with the ramp stop 70. Of course it should be understood that the configuration of the manually engageable handles 134, 136 that may be utilized to move the ramp between the retracted position and the extended position are exemplary. In other embodiments other types of handles may be used.

Figure 4:
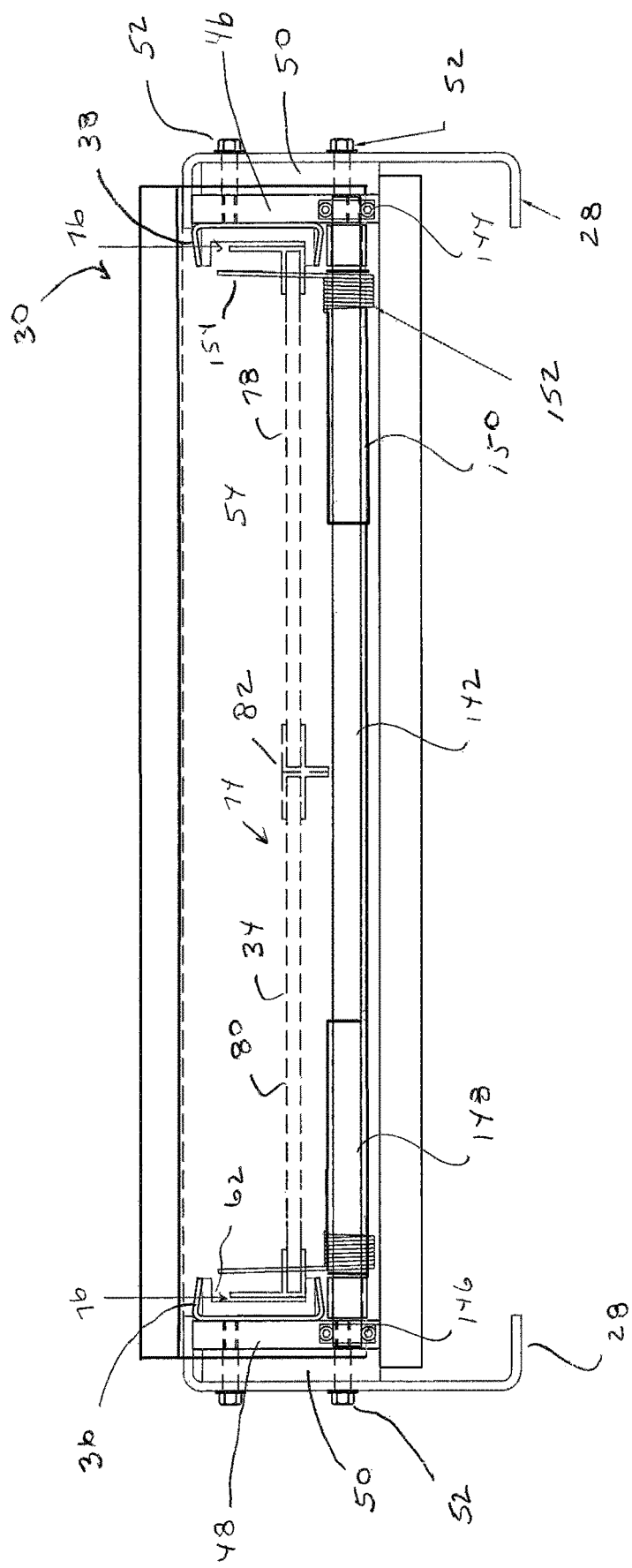
FIG. 4 is a rear view of the frame rails of the bus and the housing of the emergency egress system, with a housing door thereof in a housing closed position.
Figure 5:
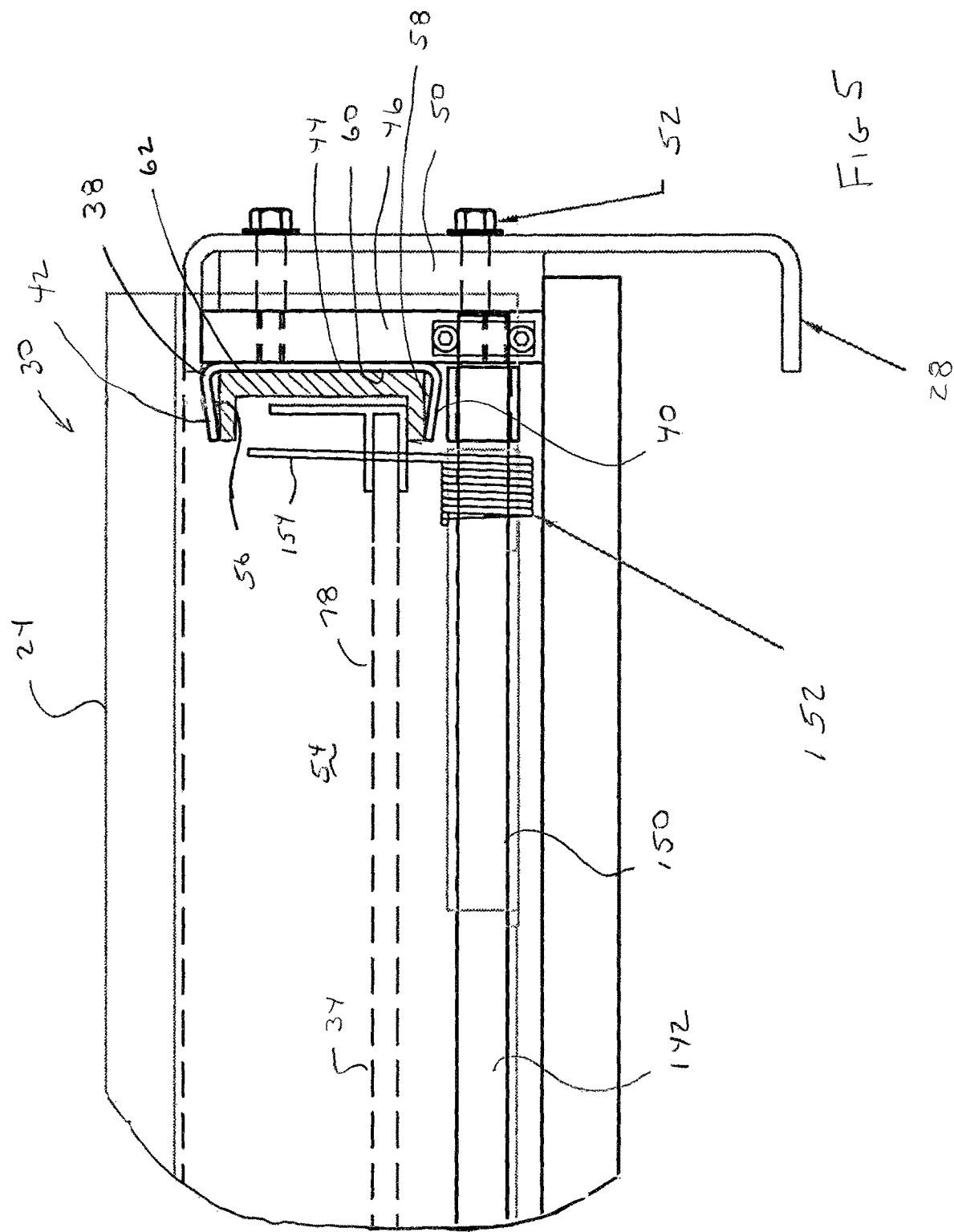
FIG. 5 is an enlarged partial rear view of the emergency egress system shown in FIG. 4.

In the exemplary arrangement the housing door 24 is rotationally movably mounted relative to the housing 30. As shown in FIG. 4, a member which comprises a shaft 142 extends horizontally across the housing in a position that is disposed below the housing opening 32. The shaft 142 is mounted in operatively supported connection with the support bars 46 and 48 through brackets 144 and 146 respectively. The housing door 24 is rotatably movably mounted in operatively supported connection with the shaft through a pair of transversely disposed sleeves 148, 150 each of which extends about the shaft. The sleeves enable the housing door 24 to move in supported connection with the shaft between the housing closed position as shown in FIG. 9, in which the housing door closes the housing opening 32, and the housing open position in which the housing door 24 is shown in FIG. 10.

In the exemplary arrangement a pair of horizontally disposed torsion springs 152 are operative to bias housing door 24 toward the housing open position. In the exemplary arrangement each of the torsion springs 152 extend in surrounding relation of a respective sleeve 148, 150 and each include a spring arm 154 which operatively engages the door to bias the door towards the housing open position. Of course it should be understood that this arrangement is exemplary and in other embodiments other approaches may be used.

The exemplary housing door 24 is configured to be in operative connection with the emergency exit door 18. The housing door 24 includes in cross section an extension 156 that in the housing closed position extends upward from the shaft 142 as shown in FIG. 9 for example. The extension includes a horizontally extending portion 158. In the housing closed position of the housing door 24, the horizontally extending portion 158 extends in the emergency exit opening 16 and underneath the emergency exit door 18. The exemplary housing door extension 156 further includes a vertically extending portion 160. The vertically extending portion 160 is configured to engage an inside face 162 of the emergency exit door 18 when the emergency exit door in the closed position.

As represented in FIG. 9 when the emergency exit door is in the closed position the vertically extending portion 160 of the housing door 24 is engaged with the inside face 162 of the door, which is operative to hold the housing door 24 in the housing closed position. In this condition an inner surface of the housing door 24 operatively engages the leading face 164 of the ramp outer end 138. In this position the housing door holds the ramp 34 in the retracted position within the housing against the biasing force of the at least one spring 66.

Figure 18:
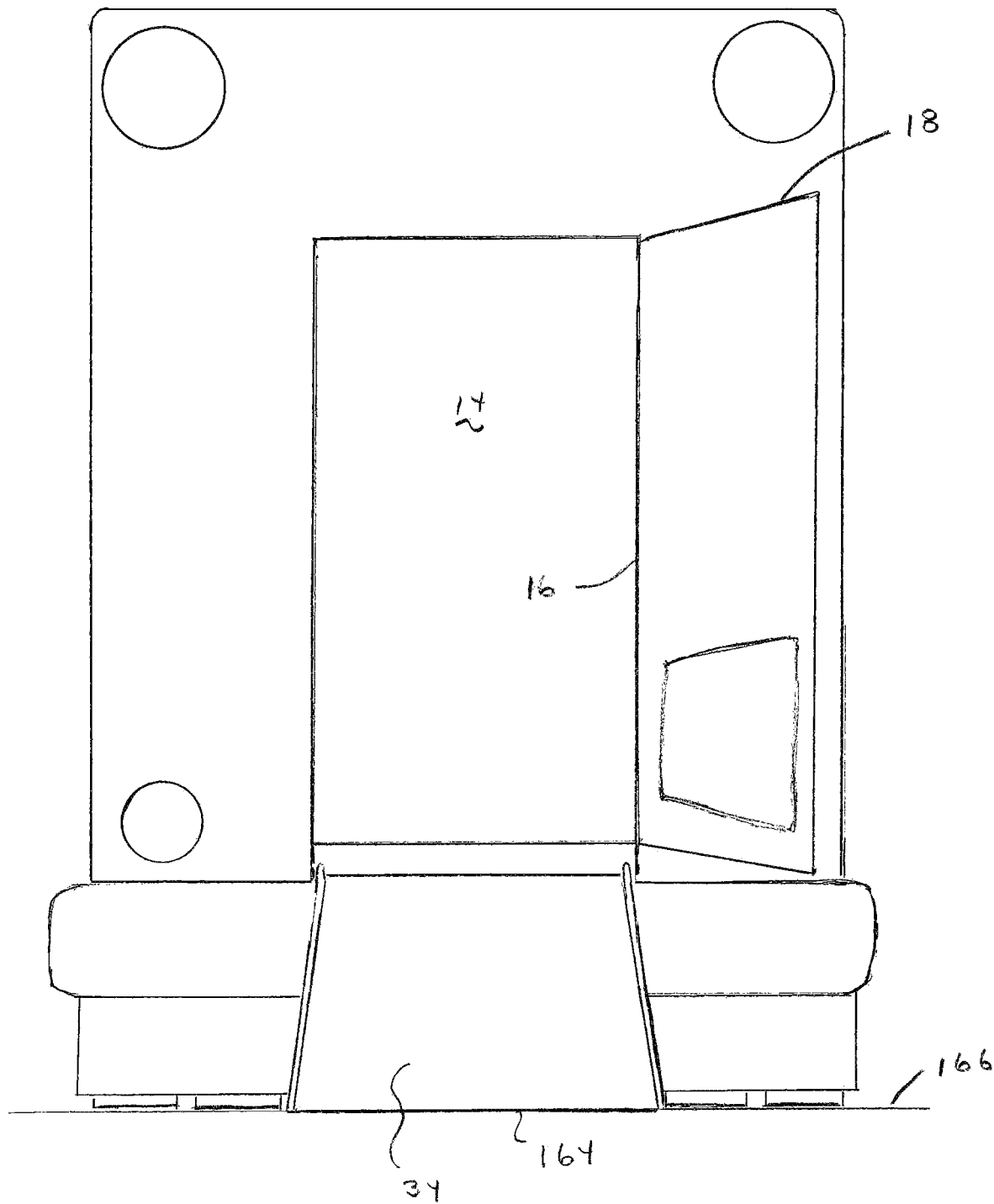
FIG. 18 is a rear view of the exemplary bus similar to FIG. 17, but with the suspension lowered responsive to opening of the emergency exit door, and with the ramp in the extended position to the ground.

In an exemplary arrangement when the emergency exit door 18 is in the openable condition and is moved to the open position, the inside surface 162 of the door no longer holds the vertically extending portion 160 in the emergency exit opening. As a result the housing door 24 moves from the housing closed position shown in FIG. 9 to the housing open position as shown in FIGS. 8, 10, 16 and 17. When the housing door 24 initially moves to the housing open position, the at least one spring 66 is operative to move the ramp 34 from the retracted position within the housing 30, toward the extended position in which the ramp extends from the housing to the ground 166. In the exemplary arrangement the spring 66 is operative to move the ramp 34 a relatively small distance outward from the opening 32 toward the extended position as shown in FIG. 16. In this exemplary arrangement the ramp 34 extends outward from the opening 32 a sufficient distance so that the ramp can be manually engaged either by the handles 134, 136 and/or by the leading face 164 of the ramp to enable the ramp to be pulled outwardly to the ramp extended position in which the leading face of the ramp 164 reaches the ground 166 as shown in FIG. 18.

In the configuration of the exemplary arrangement, the at least one spring 66 which biases the ramp 34 outward an initial relatively small distance, enables the ramp to be manually accessible so it can be moved further outwardly toward the extended position. This arrangement enables persons who wish to immediately jump from the interior area 14 of the bus to the ground 166 without taking the time to extend the ramp 34, may do so. However it should be understood that in other exemplary embodiments, further springs, motors or other devices may be in operative connection with the ramp to cause the ramp to move to the extended position so that the ramp extends to the ground automatically a very short time after the emergency exit door opens. In still other exemplary arrangements suitable circuitry or other mechanisms may be provided so that the ramp can be automatically moved from the retracted position or from an initial small amount outwardly from the retracted position, to the fully extended position, responsive to one or more user inputs, such as pressing a button that is accessible adjacent to the emergency exit opening 16. Of course these approaches are exemplary and in other embodiments different or alternative approaches to deploying and extending the ramp or other egress structure may be used.

In other exemplary arrangements other structures may be utilized for purposes of enabling the housing door to move from a housing closed position closing the opening of the housing, to the housing open position in which at least a portion of the housing door is disposed from the housing opening so as to enable the ramp to extend therefrom. For example in some arrangements a latch may be operatively engaged with the housing door such that when the emergency exit door is changed to an openable condition, the latch releases the housing door to be movable to the housing open position. In some exemplary arrangements the latch or other structure which operates to hold the housing door in a housing closed position may be operatively engaged with a latch or other structure that holds the emergency exit door in the closed position, such that when the latch which holds the emergency exit door is released so that the door is in an openable condition, the housing door moves or becomes movable so as to open the housing opening.

In other alternative arrangements the housing door may be in operative supporting connection with the back end of the ramp. In such arrangements when the ramp is retracted within the housing the housing door operates to close the housing opening. In such arrangements the ramp may be operatively engaged with a latch or other suitable structure that holds the ramp retracted within the housing. In some alternative arrangements the opening of the emergency exit door may be operative to cause the ramp to move toward the extended position responsive to a spring or other similar biasing member. In other exemplary arrangements, the ramp may be held by a latch, catch or other holding structure when the emergency exit door is in the latched and closed condition. Actuation of the structure which operates to hold the emergency exit door closed so that the door becomes in the openable condition, causes the latch, catch or other structure holding the ramp in the retracted position to be released such that the ramp moves from the retracted position toward the extended position. In different embodiments the latch or other structure that holds the ramp and/or the housing door may be operatively connected to the emergency exit door, latching structure for the emergency exit door, or other structure through mechanical connections, electrical connections or a combination thereof. Numerous different arrangements may be provided to enable the opening of the housing structure responsive to the emergency exit door being in the openable condition and/or opening, so as to enable the exemplary egress system to be deployed.

In the exemplary arrangement once the ramp is in the position shown in FIG. 16, the ramp 34 may be moved outwardly toward the extended position until the downward extending stop 70 engages the shaft 142 as represented in FIG. 10 and FIG. 8. In the exemplary arrangement the stop 70 engages the shaft 142 in the area between the sleeves 148, 150. As a result the shaft 142 serves as a member that engages the stop 70 and prevents further movement outward from the opening 32 toward the extended position once the ramp 34 is in the extended position as shown in FIG. 18. In the exemplary arrangement the ramp 34 is enabled to be rotatably movable with the stop 70 abuttingly engaged with the shaft 142 so as to enable the ramp 34 to extend an acute angle from the housing 30 to the ground 166. Further the exemplary configuration of the width of the stop 70 widely distributes any impact forces or loading forces applied to the ramp 34 as a result of the rapid deployment of the ramp and the weight of persons moving down the ramp to the ground so that the structural integrity of the components of the emergency egress system are maintained.

In addition the exemplary system enables the ramp to be returned from the extended position to the retracted position, and the housing door 24 and the emergency exit door 18 each returned to its respective closed position after the emergency is over. This enables the exemplary system to return the bus to its normal operating condition without significant delay, and the system to be reliably deployed again in the event of another emergency.

In the exemplary arrangement the suspension of the bus is interconnected with the emergency egress system. The exemplary arrangement provides automatically placing the emergency exit opening 16 closer to the ground 166 responsive at least in part to the opening of the emergency exit door 18. In an exemplary arrangement as schematically represented in FIG. 13, the bus includes an axle 168 which is supported above ground by the tires 26. The suspension of the bus includes at least one pneumatic spring 170. The pneumatic spring is supplied with air pressure through an air line 172 which maintains the pneumatic spring 170 properly pressurized and expanded to maintain the normal vehicle suspension height.

In the exemplary arrangement the air line 172 is fluidly connected to an air valve 174. The exemplary air valve 174 is changeable between open and closed conditions responsive to the position of an air release arm 176. In exemplary embodiments the release arm may comprise a movable lever, movable button, movable plunger, movable slide or other movable member, or a combination thereof. In the exemplary arrangement the air release arm is in operative connection with the ramp 34. The exemplary air release arm as shown schematically in FIG. 14, is in operative connection with the ramp through the ramp stop 70. The ramp stop is operative to maintain the air release arm 176 in a first position when the ramp 34 is in the retracted position in the housing. In the exemplary arrangement when the air release arm is in the first position as shown in solid lines in FIG. 14, the air valve 174 is in the closed condition.

When the ramp 34 is moved responsive to the at least one spring 66 toward the extended position as represented by the arrow in FIG. 14, the stop 70 moves to the position shown in phantom. This causes the air release arm 176 to move to a second position shown in phantom. The movement of the air release arm causes the air valve to change from the closed condition to the open condition. When the air valve is in the open condition, air in the pneumatic springs 170 is exhausted to atmosphere through the air valve at a rapid rate. This causes lowering of the suspension so that the emergency exit opening becomes lower and closer to the ground 166. As a result, when the ramp is moved to the extended position, the ramp extends at a smaller acute angle relative to the ground than would be the case if the bus suspension were not lowered. Further even if the ramp is not moved to the fully extended position, the movement of the emergency exit opening closer to the ground makes it easier for persons to exit from the interior area of the bus through the emergency exit opening 16. Of course it should be understood that these approaches are exemplary, and that in other arrangements other approaches may be used.

For example, in other exemplary arrangements the air valve may be actuated mechanically through operative connection with other components of the bus or the emergency egress system. For example in some arrangements changing a condition of a latch associated with the emergency exit door to an openable condition may be operative to cause the air valve to release the air in the suspension of the bus. Alternatively opening of the emergency exit door may cause movement of a lever or similar structure that is operative to cause the valve to change conditions. Alternatively in other arrangements an electrically actuated valve may be utilized. The electrically actuated valve may be operative responsive to receiving an electrical signal from a switch or one or more switches or circuit elements (or the loss of a signal from a switch or other circuit elements) to cause the air pressure to be released. Alternatively or in addition, the electrical circuitry may also be operative to cause a release of air pressure from the suspension responsive to circuitry such as an accelerometer which is operative to automatically determine that the bus or other vehicle has been involved in a collision or other impact, so as to cause the release of air pressure and facilitate egress from the emergency exit. Of course these approaches are exemplary of numerous different approaches that may be used.

FIGS. 15 through 19 demonstrate the operation of the described emergency egress system in connection with the exemplary school bus or other multi-passenger vehicle. FIG.

15 is a side view corresponding to FIG. 1 which shows the bus 10 in a normal operating position prior to the opening of the emergency exit door 18.

In an emergency one of the emergency exit door handles 20, either on the interior or the exterior of the emergency exit door, is moved to unlatch a latch or other engaging structure in operative connection with the door so it is in the openable condition and is no longer held in the closed position. When the emergency exit door 18 is moved from the closed position to the open position as shown in FIGS. 16 and 17, the housing door 24 moves responsive to the force of the torsion springs from the housing closed position to the housing open position. The ramp 34 moves from the retracted position toward the extended position a sufficient distance to enable the ramp to be manually engaged.

Figure 19:
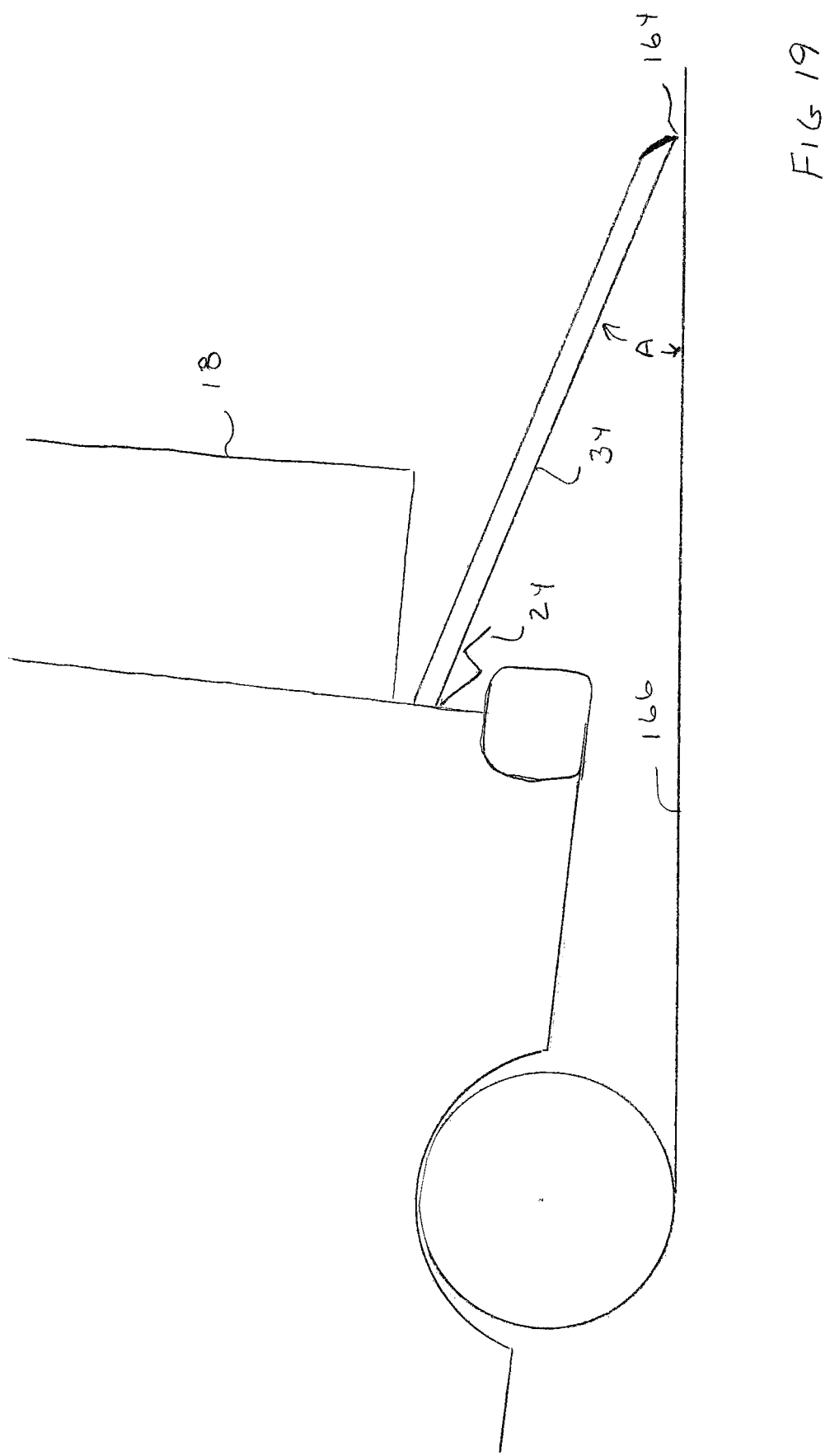
FIG. 19 is a side view of the exemplary bus corresponding to the condition of the emergency egress system as shown in FIG. 18.
Figure 20:
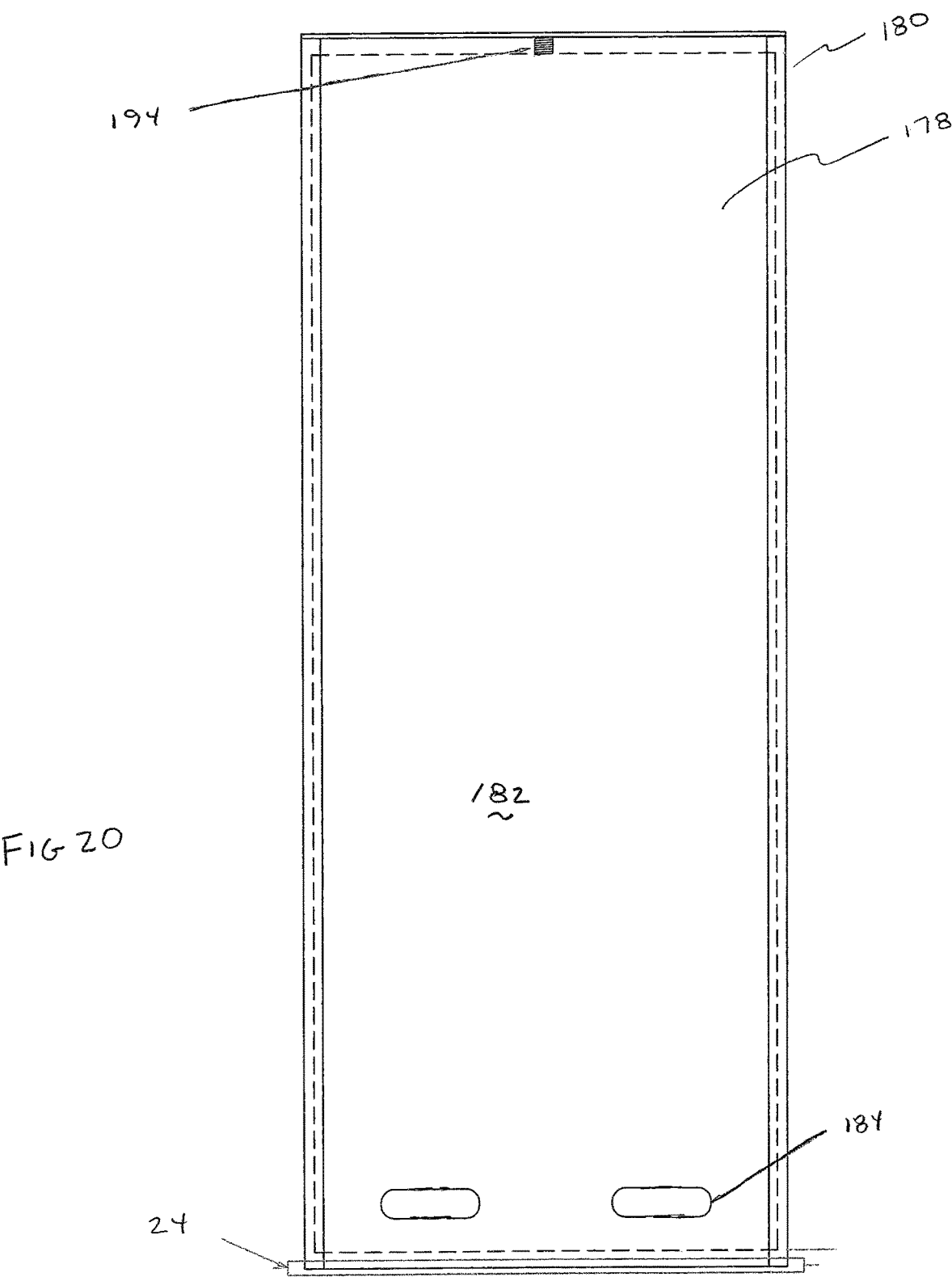
FIG. 20 is a top view of an alternative housing and alternative ramp of an exemplary embodiment.

In the exemplary arrangement a very short time after the emergency exit door 18 has been opened, the air is exhausted from the pneumatic springs lowering the suspension of the bus. This causes the emergency exit opening 16 to move closer to the ground 166 as shown in FIGS. 18 and 19. In this condition the ramp can be moved to the extended position in which the leading end 164 of the ramp 34 is in contact with the ground. The lowering of the bus suspension causes the ramp 34 to extend at a smaller acute angle (A) relative to the ground 166 than the ramp would extend if the suspension were not lowered. This makes it easier for persons to travel from the interior area 14 of the bus downward on the ramp 34 to reach the ground 166.

In some exemplary arrangements this may facilitate the ability of persons who may have difficulty walking or who may be in wheelchairs the more easily leave the bus interior area 14 through the exit opening 16 so as to reach the ground in the event of an emergency. Numerous additional features may also be provided in alternative embodiments to provide for more rapid and secure egress under emergency conditions from the vehicle for persons of different sizes or with different physical conditions and capabilities.

FIGS. 20-24 show an alternative exemplary embodiment of a ramp 178. The exemplary ramp 178 is movably mounted in a housing 180. Housing 180 may be generally similar to housing 30 previously described. For purposes hereof the components of the alternative housing 180 will be described using the same reference numbers as those used in connection with the housing 30 except in cases where the structures differ.

The alternative ramp 178 includes a base portion 182. The base portion 182 is comprised of a unitary piece of suitable material such as aluminum. In some exemplary arrangements the base portion 182 may include a non skid upper surface to facilitate walking thereon. The base portion 182 includes handles 184 that extend therethrough similar to the previously described embodiment. The exemplary ramp 178 further includes a pair of vertically extending end portions 186, 188. In the exemplary arrangement the end portions comprise longitudinally elongated reinforcing struts that are in attached connection with the base portion 182. In the exemplary arrangement the end portions extend in and are movable within the cross-sectional recesses bounded by the side rails 36, 38 and the respective plastic inserts therein. In the exemplary arrangement the reinforcing struts which bound the end portions have a uniform cross-sectional profile which provides additional resistance to bending and deformation due to loading of the ramp.

Figure 21:
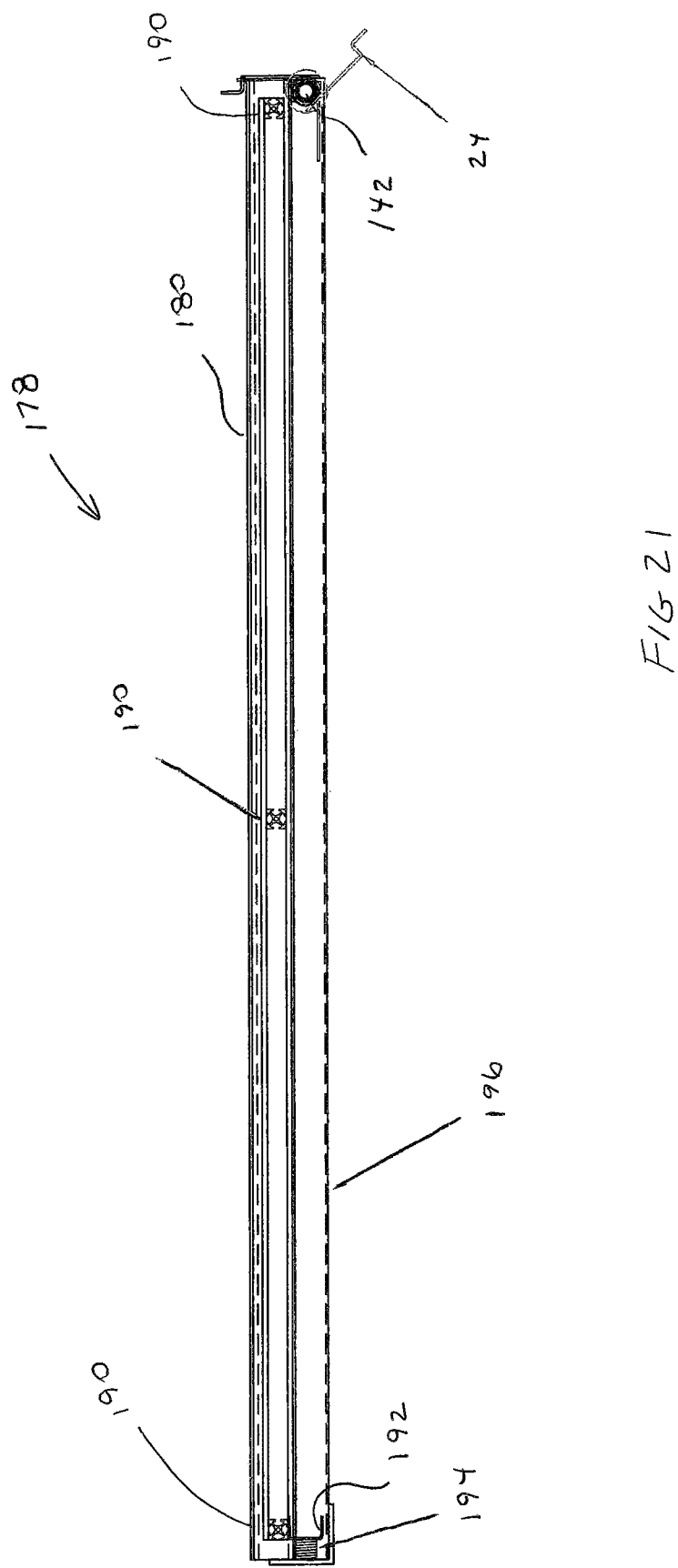
FIG. 21 is a side view of the alternative ramp and housing of FIG. 20.
Figure 22:
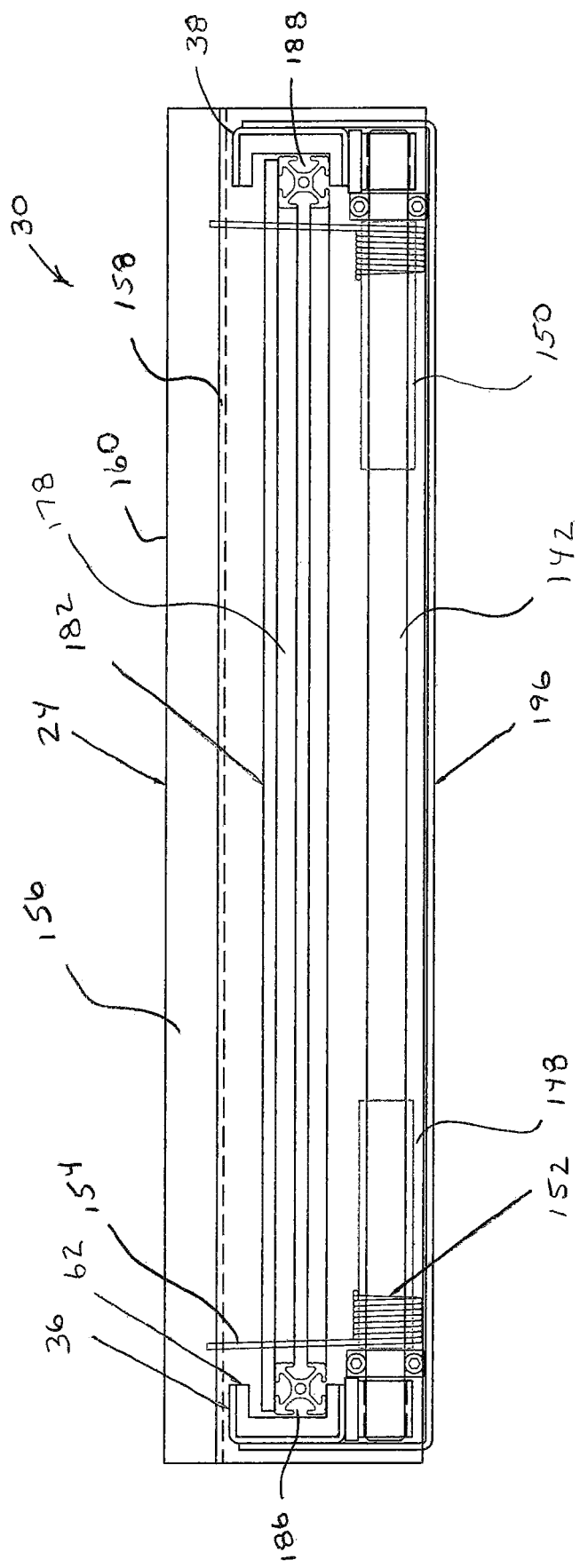
FIG. 22 is a rear view of the alternative ramp and housing.
Figure 23:
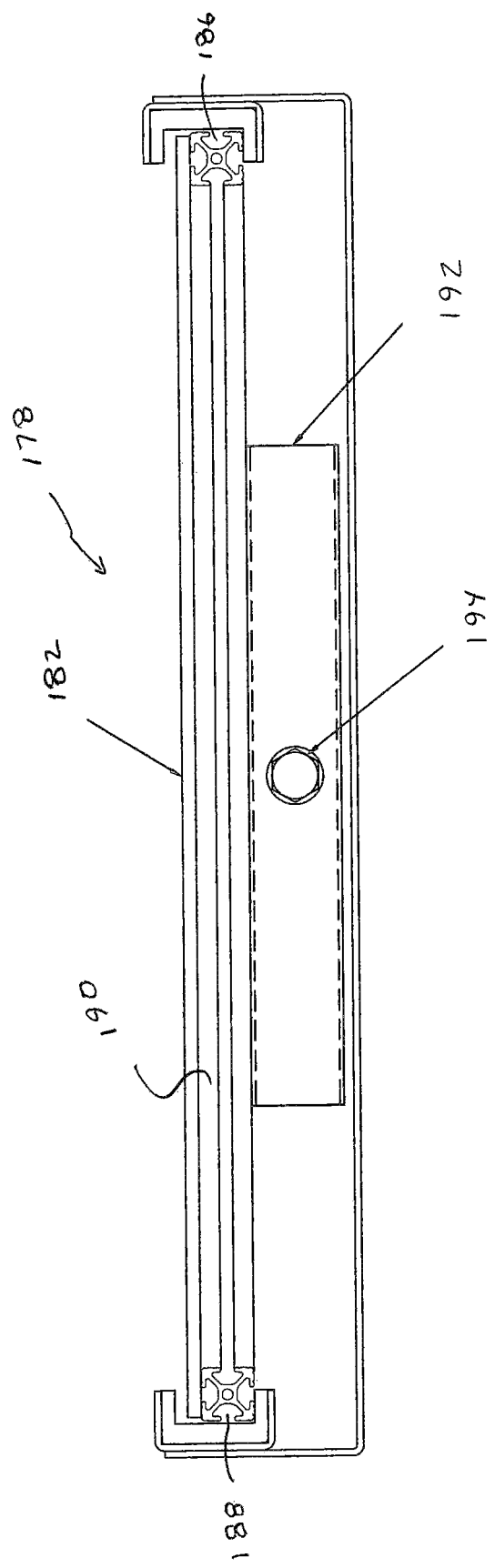
FIG. 23 is a front view of the alternative ramp and housing.

In the exemplary arrangement the ramp 178 further includes a plurality of transversely extending reinforcements 190. As shown in FIG. 21, in the exemplary arrangement the transverse reinforcements are positioned at the rear side and the front side of the ramp 178 as well as at the mid point thereof. The transverse reinforcements are held in engaged relation with the base portion and with the adjacent longitudinal reinforcing struts through welding or other fixed attaching methods. The transversely extending reinforcements 190 provide further rigidity and greater load carrying capability without deformation of the ramp 178. Of course it should be understood that this arrangement is exemplary and other embodiments other configurations may be used.

The exemplary alternative ramp 178 is in operative connection with a ramp stop 192. The ramp stop 192 performs a function similar to the previously described ramp stop 70 in limiting the movement of the ramp outward from the housing to the extended position. The alternative stop 192 has a generally U-shaped cross section configuration that facilitates engagement with the shaft 142 and enables rotational movement of the ramp in engagement therewith. The stop 192 is also engageable with a compression spring 194. The compression spring 194 operates in a manner similar to spring 66 and biases the ramp from the retracted position toward the extended position.

In the exemplary arrangement the housing 180 is closed at its lower end by a panel 196. The exemplary panel 196 may comprise one or more planar panel segments that serve to limit the amount of dirt or other materials that may enter the interior area of the housing. The exemplary panel 196 in the exemplary arrangement helps to assure that dirt, debris, ice or other material will not accumulate within the housing in a manner that impedes the operation of the emergency egress system. In an exemplary arrangement, the panel 196 may be comprised of a lightweight material such as a plastic. However in other exemplary embodiments other arrangements and materials may be used. Further while in the exemplary arrangement the panel is configured to close the bottom of the housing, other arrangements may include closure panels at the front and/or top of the housing to further reduce the risk of infiltration of dirt or other debris. Further in exemplary arrangements sealing or gasketing material may be utilized for purposes of assuring that the panel or panels operate to maintain a liquid tight arrangement to prevent the infiltration of undesirable materials into the housing interior. Alternatively or in addition, suitable gasketing or other materials may also be utilized for purposes of sealing the abutting housing structures and the housing door 24 when the housing door is in the housing closing position. Of course these approaches are exemplary and other embodiments other arrangement may be used.

Thus the exemplary embodiments achieve improved operation, eliminate difficulties encountered in the use of prior devices and systems, and obtain the useful results described herein.

In the foregoing description certain terms have been used for brevity, clarity and understanding. However, no unnecessary limitations are to be implied therefrom because such terms are used for descriptive purposes and are intended to be broadly construed. Moreover, the descriptions and illustrations herein are by way of examples and the inventive features are not limited to the exact features shown and described.

Further in the following claims any feature described as a means for performing a function shall be construed as encompassing any means known to those skilled in the art as being capable of carrying out the recited function and shall not be deemed limited to the particular means shown or described for performing the recited function in the foregoing description or mere equivalents thereof.

Having described the features, discoveries and principles of the exemplary embodiments, the manner in which they are constructed and operated, and the advantages and useful results attained; the new and useful structures, devices, elements, arrangements, parts, combinations, systems, equipment, operations, methods, processes and relationships are set forth in the appended claims.

I claim:

1. Apparatus operative to provide emergency egress for persons from an interior area of a bus,
   the bus including an emergency exit opening closable by an emergency exit door, wherein the emergency exit door is openable from at least one of the interior area or an exterior area of the bus,
   the apparatus comprising:
   a housing, wherein the housing is in operatively fixed connection with the bus and is positioned below the interior area of the bus,
      wherein the housing includes a housing opening,
         wherein the housing opening is positioned in horizontal transverse alignment with and vertically below the emergency exit opening,
   a ramp,
      wherein the ramp is in movable supported connection within the housing,
      wherein the ramp is movable between a retracted position in which the ramp is generally fully within the housing, and an extended position in which the ramp extends from the housing opening to ground,
   a housing door,
      wherein the housing door is movably mounted in operative connection with the housing,
      wherein the housing door is movable between
         a housing closed position wherein the housing door closes the housing opening, and
         housing open position wherein the housing door is disposed away from at least a portion of the housing opening and the ramp is extendable from the housing opening,
      wherein the housing door is in operative connection with the emergency exit door such that the housing door is operative to move from the housing closed position to the housing open position responsive at least in part to the emergency exit door being opened.

2. The apparatus according to claim 1
   and further including
   at least one ramp deployment spring, wherein the at least one ramp deployment spring is in operative connection with the ramp,
   wherein the at least one ramp deployment spring is operative to cause the ramp to move from the retracted position toward the extended position responsive at least in part to the housing door being in the housing open position.

3. The apparatus according to claim 2
   wherein the at least one ramp deployment spring includes at least one compression spring that acts between the housing and the ramp,
   wherein in the closed position the ramp operatively biasingly engages the housing door, and the housing door holds the ramp in the retracted position,
   and wherein movement of the housing door to the housing open position causes the ramp to no longer operatively engage and be held by the housing door in the retracted position, and the biasing force of the at least one compression spring causes the ramp to move from the retracted position.

4. The apparatus according to claim 2
   wherein the housing includes a pair of elongated, horizontally disposed side rails,
      wherein each side rail includes an elongated horizontally inward extending lower lip,
      wherein the ramp is movable between the retracted position and the extended position in operatively supported connection with the lower lips.

5. The apparatus according to claim 4
   wherein each side rail includes a generally C-shaped channel,
      each channel including
         an elongated horizontally inward extending upper lip,
         a vertically extending web portion, and
         the lower lip,
   wherein each of the upper lip, web portion and lower lip include respective inner faces, wherein the inner faces of the upper lip, lower lip and web portion of the side rails bound a channel cavity,
   wherein the ramp is constrained to move horizontally within the channel cavity.

6. The apparatus according to claim 5
   wherein low friction plastic material overlies the inner faces of each of the upper lips, lower lips and web portions of each C-shaped channel,
   wherein the low friction plastic material reduces resistance to movement of the ramp in the channel cavity.

7. The apparatus according to claim 4
   wherein the ramp is in operative connection with a stop,
   wherein the stop is operative to prevent the ramp from moving outward from the housing beyond the extended position.

8. The apparatus according to claim 7
   and further including
   a member, wherein the member extends horizontally across and below the housing opening,
   wherein the stop extends downwardly from the ramp and is operative to engage the member intermediate of the side rails in the extended position of the ramp.

9. The apparatus according to claim 8
   wherein the member comprises a shaft,
   wherein the housing door is rotatable in operatively supported connection with the shaft.

10. The apparatus according to claim 7
    wherein the ramp is in operative connection with the stop adjacent an inner end of the ramp,
    wherein the ramp includes an outer end, wherein the outer end is opposed of the inner end,
    at least one handle in operative connection with the ramp adjacent the outer end,
    wherein the ramp is movable toward the extended position through manual engagement of the at least one handle.

11. The apparatus according to claim 10
    wherein the at least one handle comprises an opening through the ramp.

12. Apparatus operative to provide emergency egress for persons from an interior area of a bus,
    the bus including an emergency exit opening closable by an emergency exit door, wherein the emergency exit door is openable from at least one of the interior area or an exterior area of the bus, wherein the emergency exit door is changeable between a latched closed condition in which the emergency exit door is held in a closed position closing the opening, and an openable condition in which the emergency exit door is changeable between the closed position and an open position in which at least a portion of the door is movable away from the opening, the apparatus comprising:

a housing, wherein the housing is in operatively fixed connection with the bus and is positioned below the interior area of the bus, wherein the housing includes a housing opening, wherein the housing opening is positioned vertically below the emergency exit opening and in horizontal alignment with at least a portion of the emergency exit opening, a ramp, wherein the ramp is movable in operatively supported connection within the housing, wherein the ramp is movable between a retracted position in which the ramp is within the housing and is fully disposed away from ground, and an extended position in which the ramp extends from the housing opening to ground, a housing door, wherein the housing door is configured to close the housing opening and is movably mounted in operative supporting connection with the housing, wherein the housing door is movable between a housing closed position wherein the housing door closes the housing opening, and housing open position wherein the housing door is disposed away from at least a portion of the housing opening and the ramp is extendable outward from the housing opening, wherein the housing door is in operative connection with the emergency exit door, such that the housing door is operative to move from the housing closed position to the housing open position responsive at least in part to the emergency exit door being in the openable condition.

13. The apparatus according to claim 12 wherein the housing includes a pair of elongated, horizontally disposed side rails, wherein each side rail includes an elongated horizontally inward extending lower lip, wherein the ramp is movable between the retracted position and the extended position in operatively supported connection with the lower lips, wherein the ramp in vertical cross-section includes a horizontal base portion, and a pair of vertically extending end portions, wherein an end portion extends vertically at each horizontal side of the base portion, wherein each respective end portion is disposed horizontally inward of at least a portion of a respective side rail and vertically above a lower lip of a respective side rail.

14. The apparatus according to claim 13 wherein in vertical cross section the base portion includes at least one flat plate, wherein the at least one flat plate is bounded by a pair of opposed horizontally extending top and bottom faces and a vertically extending lateral side face extending between the top and bottom faces, wherein each vertically extending end portion includes an end piece including an upper flange that vertically overlies the top face, a bottom flange that vertically underlies the bottom face, a recess, wherein the top and bottom flanges bound the recess, and wherein the side face extends in the recess, a side flange, wherein the side flange extends vertically upward and perpendicular to the top face.

15. The apparatus according to claim 13 wherein in vertical cross section the base portion includes a pair of adjacent flat plates, wherein each flat plate is bounded by a respective pair of horizontally extending top and bottom faces and a vertically extending inside face that extends between the top and bottom faces, a connector piece, wherein the connector piece includes a top flange that overlies the top face of one of the flat plates, a bottom flange that underlies the bottom face of the one flat plate, a recess bounded by the top and bottom flanges, wherein the inside face of the one flat plate extends in the recess, a further top flange that overlies the top face of the other of the flat plates, a further bottom flange that underlies the bottom face of the other of the flat plates, a further recess bounded by the further top flange and further bottom flange, wherein the inside face of the other of the flat plates extends in the further recess.

16. The apparatus according to claim 13 wherein the bus includes a pair of horizontally disposed, longitudinally extending frame rails, wherein the emergency exit opening is positioned vertically higher and horizontally between the frame rails, wherein the housing is mounted between and in operatively supported connection with each of the frame rails, wherein the ramp is movable parallel to each of the frame rails between the retracted and extended positions.

17. The apparatus according to claim 16 and further including at least two spacers, wherein at least one spacer extends on each horizontal side of the housing and extends between a respective frame rail and a respective side rail of the housing.

18. The apparatus according to claim 16 wherein the bus includes a tire supported axle, wherein at least one pneumatic spring extends operatively between the frame rails and the axle, and further comprising an air valve, wherein the air valve is in operative fluid connection with the at least one pneumatic spring, wherein the air valve is changeable between open and closed conditions, wherein opening the emergency exit door is operative to cause the air valve to change from the closed condition to the open condition, whereby air is released from the at least one pneumatic spring and the emergency exit opening is moved closer to ground.

19. The apparatus according to claim 18 wherein the air valve includes an air release arm, wherein movement of the air release arm is operative to change the valve from the closed condition to the open condition, wherein the air release arm is in operative connection with the ramp, wherein movement of the ramp from the retracted position toward the extended position by the at least one ramp deployment spring is operative to cause air release arm movement to change the valve from the closed condition to the open condition.

20. The apparatus according to claim 18 wherein the housing door includes an extension that extends above the housing,
wherein the extension operatively engages the emergency exit door.

21. The apparatus according to claim 20 wherein the extension includes a horizontal extension portion and a vertical extension portion,
wherein in the closed position of the housing door the horizontal extension portion extends horizontally in the emergency exit opening, and the vertical extension portion engages an inside face of the emergency exit door.

22. The apparatus according to claim 12 wherein the bus includes a tire supported axle,
wherein at least one pneumatic spring extends operatively between the frame rails and the axle,
and further comprising an air valve,
wherein the air valve is in operative fluid connection with the at least one pneumatic spring, wherein the air valve is changeable between open and closed conditions,
wherein the air valve is operative to change from the closed condition to the open condition, responsive at least in part to the emergency exit door being in the openable condition,
whereby air is released from the at least one pneumatic spring and the emergency exit opening is moved closer to ground.

23. The apparatus according to claim 12 wherein the housing door includes an extension that extends above the housing,
wherein the extension operatively engages the emergency exit door.

24. The apparatus according to claim 23 wherein the extension includes a horizontal extension portion and a vertical extension portion,
wherein in the closed position of the housing door the horizontal extension portion extends horizontally in the emergency exit opening, and the vertical extension portion engages an inside face of the emergency exit door,
wherein movement of the emergency exit door to the open position is operative to enable the housing door to move from the housing closed position to the housing open position.

25. Apparatus operative to provide emergency egress for persons from an interior area of a bus,
the bus including an emergency exit opening closable by an emergency exit door, wherein the emergency exit door is openable from at least one of the interior area or an exterior area of the bus,
the apparatus comprising:
a housing,
wherein the housing is in operatively fixed connection with the bus and is positioned below the interior area of the bus,
wherein the housing includes
a housing opening,
wherein the housing opening is positioned in horizontal transverse alignment with and vertically below the emergency exit opening,
a pair of elongated, horizontally disposed side rails, wherein each side rail includes an elongated horizontally inward extending lower lip,
a ramp,
wherein the ramp is in movable operative supported connection with the housing,
wherein the ramp is movable in operatively supported connection with the lower lip of each side rail between
a retracted position in which the ramp is generally fully within the housing, and
an extended position in which the ramp extends from the housing opening to the ground,
a stop,
wherein the stop is in operative connection with the ramp, and extends vertically downward thereon,
a shaft,
wherein the shaft extends horizontally and below the housing opening,
wherein the stop in the extended position of the ramp, is in operative engagement with the shaft and prevents the ramp from moving outward from the housing beyond the extended position,
a housing door,
wherein the housing door is movably mounted in operatively supported connection with the shaft and is movable between
a housing closed position wherein the housing door closes the housing opening, and
a housing open position wherein the housing door is disposed away from at least a portion of the housing opening and the ramp is extendable from the housing opening,
wherein the housing door is in operative connection with the emergency exit door such that the housing door is operative to move from the housing closed position to the housing open position responsive at least in part to the emergency exit door being opened.

26. Apparatus operative to provide emergency egress for persons from the interior area of a bus,
the bus including an emergency exit opening closable by an emergency exit door, wherein the emergency exit door is openable from at least one of the interior area or an exterior area of the bus, wherein the emergency exit door is changeable between a latched closed condition in which the emergency exit door is held in a closed position closing the opening, and an openable condition in which the emergency exit door is changeable between the closed position and an open position in which at least a portion of the door is movable away from the opening, and
wherein the bus further includes
a pair of horizontally disposed, longitudinally extending frame rails wherein the emergency exit opening is positioned vertically higher than the frame rails,
a tire supported axle and at least one pneumatic spring, wherein the at least one pneumatic spring operatively extends in intermediate relation of the frame rails and the tire supported axle,
the apparatus comprising:
a housing,
wherein the housing is in operatively fixed connection with the bus and is positioned below the interior area of the bus,
wherein the housing includes a housing opening, wherein the housing opening is positioned vertically below the emergency exit opening and in horizontal alignment with at least a portion of the emergency exit opening, a ramp,
wherein the ramp is movable in operatively supported connection within the housing,
wherein the ramp is movable between a retracted position in which the ramp is within the housing and is fully disposed away from ground, and an extended position in which the ramp extends from the housing opening to ground, a housing door,
wherein the housing door is configured to close the housing opening and is movably mounted in operative supporting connection with the housing,
wherein the housing door is movable between
a housing closed position wherein the housing door closes the housing opening, and
a housing open position wherein the housing door is disposed away from at least a portion of the housing opening and the ramp is extendable outward from the housing opening,
wherein the housing door is in operative connection with the emergency exit door, wherein the housing door is operative to move from the housing closed position to the housing open position responsive at least in part to the emergency exit door being in the openable position, an air valve,
wherein the air valve is in operative fluid connection with the at least one pneumatic spring, wherein the air valve is changeable between an open condition and a closed condition,
wherein the air valve is in operative connection with the emergency exit door, wherein the air valve is operative to change from the closed condition to the open condition responsive at least in part to the emergency exit door being in the openable condition,
whereby air is released from the at least one pneumatic spring, and the emergency exit opening is moved closer to ground.

27. Apparatus operative to provide emergency egress for persons from the interior area of a bus,
the bus including an emergency exit opening closable by an emergency exit door, wherein the emergency exit door is openable from at least one of the interior area or an exterior area of the bus, wherein the emergency exit door is changeable between a latched closed condition in which the emergency exit door is held in a closed position closing the opening, and an openable condition in which the emergency exit door is changeable between the closed position and an open position in which at least a portion of the door is movable away from the opening, and
wherein the bus further includes
a pair of horizontally disposed, longitudinally extending frame rails wherein the emergency exit opening is positioned vertically higher than the frame rails,
a tire supported axle and at least one pneumatic spring, wherein the at least one pneumatic spring extends in operative intermediate relation of the frame rails and the tire supported axle,
the apparatus comprising:
a housing,
wherein the housing is in operatively fixed connection with the bus and is positioned below the interior area of the bus,
wherein the housing includes a housing opening,
wherein the housing opening is positioned vertically below the emergency exit opening and in horizontal alignment with at least a portion of the emergency exit opening, a ramp,
wherein the ramp is movable in operatively supported connection with the housing,
wherein the ramp is movable between a retracted position in which the ramp is within the housing and is fully disposed away from ground, and an extended position in which the ramp extends from the housing to ground, a housing door,
wherein the housing door is configured to close the housing opening and is movably mounted in operatively supported connection with the housing,
wherein the housing door is movable between
a housing closed position wherein the housing door closes the housing opening, and
a housing open position wherein the housing door is disposed away from at least a portion of the housing opening and the ramp is extendable outward from the housing opening, an air valve,
wherein the air valve is in operative fluid connection with at least one pneumatic spring, wherein the air valve is changeable between open and closed conditions,
wherein the air valve is in operative connection with the ramp, wherein the air valve is operative to change from the closed condition to the open condition responsive at least in part to movement of the ramp toward the extended position,
whereby air is released from the at least one pneumatic spring, and the emergency exit opening is moved closer to ground.

28. The apparatus according to claim 27
wherein the ramp is in operative connection with the emergency exit door,
wherein the ramp is operative to move toward the extended position responsive at least in part to movement of the emergency exit door from the closed position toward the open position.

* * * * *